(12) United States Patent
Bao et al.

(10) Patent No.: US 9,319,320 B2
(45) Date of Patent: Apr. 19, 2016

(54) TRAFFIC FLOW ESTABLISHMENT METHOD AND DEVICE AND TRAFFIC FLOW MODIFICATION METHOD AND DEVICE

(75) Inventors: Dongshan Bao, Beijing (CN); Yubao Zhou, Beijing (CN); Chaonan Peng, Beijing (CN); Huijuan Yao, Beijing (CN); Xiaoyan Yu, Beijing (CN); Shenfa Liu, Beijing (CN)

(73) Assignee: Nufront Mobile Communications Technology Co., Ltd., Beijing (CN)

( * ) Notice: Subject to any disclaimer, the term of this patent is extended or adjusted under 35 U.S.C. 154(b) by 42 days.

(21) Appl. No.: 14/008,306

(22) PCT Filed: Mar. 6, 2012

(86) PCT No.: PCT/CN2012/071955
§ 371 (c)(1),
(2), (4) Date: Dec. 3, 2013

(87) PCT Pub. No.: WO2012/130019
PCT Pub. Date: Oct. 4, 2012

(65) Prior Publication Data
US 2014/0086045 A1    Mar. 27, 2014

(30) Foreign Application Priority Data

| Mar. 31, 2011 | (CN) | 2011 1 0081288 |
| Jul. 6, 2011 | (CN) | 2011 1 0188606 |
| Feb. 8, 2012 | (CN) | 2012 1 0027851 |
| Feb. 8, 2012 | (CN) | 2012 1 0027852 |
| Feb. 8, 2012 | (CN) | 2012 1 0027916 |
| Feb. 17, 2012 | (CN) | 2012 1 0036754 |
| Feb. 17, 2012 | (CN) | 2012 1 0038079 |
| Feb. 17, 2012 | (CN) | 2012 1 0038757 |

(51) Int. Cl.
*H04L 12/803* (2013.01)
*H04W 76/02* (2009.01)
*H04W 28/18* (2009.01)

(52) U.S. Cl.
CPC ............ *H04L 47/125* (2013.01); *H04W 76/02* (2013.01); *H04W 28/18* (2013.01)

(58) Field of Classification Search
None
See application file for complete search history.

(56) References Cited

U.S. PATENT DOCUMENTS 7,023,825 B1 *  4/2006  Haumont et al. ............. 370/338
7,483,374 B2 *  1/2009  Nilakantan et al. ........... 370/235

(Continued)

FOREIGN PATENT DOCUMENTS

| CN | 101155053 A | 4/2008 |
| CN | 101515858 A | 8/2009 |
| CN | 101686191 A | 3/2010 |

OTHER PUBLICATIONS

International Search Report issued in International Application No. PCT/CN2012/071955 on Jun. 14, 2012.

*Primary Examiner* — Kerri Rose
(74) *Attorney, Agent, or Firm* — Morgan, Lewis & Bockius LLP

(57) ABSTRACT

In the present invention, before data transmission, a "connection", between a requesting end and a destination end, identified by a traffic flow identifier (FID) is established or modified through traffic flow management. Therefore, when the requesting end and the destination end perform data transmission on the traffic flow, the FID alone can sufficiently serve as the identifier, so as to save the need of carrying the destination end identifier in each exchanged data packet, thereby simplifying the operation.

12 Claims, 21 Drawing Sheets

221 — send dynamic service management request carrying FID and FID maximum buffer capability 222 — receive the response to dynamic service management request

(56) References Cited

U.S. PATENT DOCUMENTS

| | | | |
|---|---|---|---|
| 2002/0057699 A1* | 5/2002 | Roberts | 370/395.32 |
| 2003/0198204 A1* | 10/2003 | Taneja et al. | 370/332 |
| 2006/0160533 A1* | 7/2006 | Chou et al. | 455/422.1 |
| 2007/0078955 A1* | 4/2007 | Siliquini et al. | 709/220 |
| 2007/0115891 A1* | 5/2007 | Kim | 370/332 |
| 2009/0059840 A1* | 3/2009 | Moon et al. | 370/328 |
| 2010/0020681 A1* | 1/2010 | Nakashima et al. | 370/229 |
| 2010/0054208 A1 | 3/2010 | Kojima | |
| 2010/0195561 A1* | 8/2010 | Yamaguchi et al. | 370/315 |
| 2010/0278189 A1* | 11/2010 | Soon | 370/412 |
| 2011/0194538 A1* | 8/2011 | Zheng et al. | 370/335 |
| 2011/0205972 A1* | 8/2011 | Yuk et al. | 370/328 |
| 2011/0255507 A1* | 10/2011 | Gomez Velez et al. | 370/331 |
| 2012/0147902 A1* | 6/2012 | Kim et al. | 370/474 |
| 2013/0010762 A1* | 1/2013 | Jung et al. | 370/331 |

* cited by examiner

TRAFFIC FLOW ESTABLISHMENT METHOD AND DEVICE AND TRAFFIC FLOW MODIFICATION METHOD AND DEVICE

CROSS-REFERENCE TO RELATED APPLICATION

1) This application claims the priority of CN Application No. 201110081288.6 filed on Mar. 31, 2011 and titled "A WIRELESS COMMUNICATION METHOD", which is incorporated herein by reference in its entirety.

2) This application claims the priority of CN Application No. 201110188606.9 filed on Jul. 6, 2011 and titled "TRAFFIC FLOW ESTABLISHMENT METHOD AND DEVICE AND TRAFFIC FLOW CHANGE METHOD AND DEVICE", which is incorporated herein by reference in its entirety.

3) This application claims the priority of CN Application No. 201210027851.6 filed on Feb. 8, 2012 and titled "TRAFFIC FLOW ESTABLISHMENT METHOD AND DEVICE AND TRAFFIC FLOW CHANGE METHOD AND DEVICE", which is incorporated herein by reference in its entirety.

4) This application claims the priority of CN Application No. 201210027916.7 filed on Feb. 8, 2012 and titled "TRAFFIC FLOW MANAGEMENT METHOD AND DEVICE", which is incorporated herein by reference in its entirety.

5) This application claims the priority of CN Application No. 201210027852.0 filed on Feb. 8, 2012 and titled "TRAFFIC FLOW DELETING METHOD AND DEVICE", which is incorporated herein by reference in its entirety.

6) This application claims the priority of CN Application No. 201210036754.3 filed on Feb. 17, 2012 and titled "TRAFFIC FLOW ESTABLISHMENT METHOD AND DEVICE AND TRAFFIC FLOW CHANGE METHOD AND DEVICE", which is incorporated herein by reference in its entirety.

7) This application claims the priority of CN Application No. 201210038757.0 filed on Feb. 17, 2012 and titled "TRAFFIC FLOW MANAGEMENT METHOD AND DEVICE", which is incorporated herein by reference in its entirety.

8) This application claims the priority of CN Application No. 201210038079.8 filed on Feb. 17, 2012 and titled "TRAFFIC FLOW DELETING METHOD AND DEVICE", which is incorporated herein by reference in its entirety.

FIELD OF THE INVENTION

This invention belongs to the field of wireless communication, particularly related to traffic flow establishing method and device, and traffic flow changing method and device.

BACKGROUND OF THE INVENTION

In recent years, wireless communication systems have been developed rapidly. For example, wireless Local Area Network (WLAN) technologies based on IEEE 802.11 (i.e. WiFi), a Bluetooth system based on IEEE 802.15, and Femto technologies oriented to indoor applications that are derived from a mobile communication system have been widely used.

The WiFi technology based on IEEE 802.11 is the most extensively used wireless network transmission technology at present. A WiFi system is defective for its relatively low system efficiency and significant waste of wireless resources due to the employment of a Carrier Sense Multiple Access with Collision Avoidance (CSMA/CA) mechanism. An essential reason for such a defect lies in that the CSMA/CA mechanism is a random multi-access mechanism based on competition, and there exist competitions for the access right to wireless resources between a Central Access Point (CAP) and a Station (STA) or between different STAs due to the CSMA/CA mechanism. Simultaneous competitions for a wireless channel will result in a collision, thus leading to the wireless resource waste. To avoid such collision, the CSMA/CA mechanism requires the CAPs or STAs to retreat randomly from the competition for the wireless channel. If all of the CAPs and STAs retreat, the wireless channel is not utilized even it is idle, causing significant waste of the wireless channel. Therefore, the system efficiency of IEEE 802.11 is relatively low. For example, although the peak rate at the physical layer in an IEEE 802.11g system may reach 54 Mbps, the reachable peak rate of a large-packet download service at the Transmission Control Protocol (TCP) layer is no more than 30 Mbps. Despite of the above defects, the IEEE 802.11 system is flexible and does not rely on a centralized control mechanism, so that the device costs are relatively low.

A Femto technology based on 3GPP standards, which is derived from a mobile communication system, is a new technology intended for indoor coverage. Since about 70% of data services is conducted in doors according to data statistics of the 3G system, an indoor high-speed data access solution is especially important. A Femto base station, which is named as a Pico Base Transceiver Station, is small in volume (like in WiFi technologies) and flexible in deployment. The Femto base station inherits almost all features of a mobile communication system due to its derivation from the mobile communication system. Considering its limited coverage range and a relatively small number of access users, the Femto device is designed with a decreased processing capability, to reduce the device costs. In terms of a duplexing manner, Femto base stations may operate in two duplexing mechanisms, i.e. a Frequency Division Duplexing (FDD) and a Time Division Duplexing (TDD), just like the mobile communication system. Because FDD uplink and downlink carrier resources are symmetric, certain resource waste is caused for a data service in a FDD system due to a service feature that uplink and downlink data flow of the data service are asymmetric. In a TDD system, however, both uplink and downlink operate at the same carrier, and different wireless resources are allocated for the uplink and downlink through the division of time resources, thus the TDD system can be more suitable for a data service characterized by asymmetric uplink and downlink service demands, in comparison with an FDD system. In the mobile communication system (including a Femto system), however, due to the static allocation of uplink and downlink resources in the TDD duplexing manner, it is difficult to implement dynamic matching between service demands and resource division in the case of various data services with different demands, such as web surfing, mobile videos and mobile games. Due to the employment of a centralized control mechanism based on scheduling, and hence there is no wireless resource waste that is caused by competition collision between the Base Station or CAP and a User Equipment or between User Equipments and random retreat, the Femto technology is advantageous for a higher link efficiency in comparison with the WiFi technology.

Data transmission in wireless communication system, refers to the communication Correspondent Node complete data transmit-receive through interaction, this interaction can be the interaction between the network side and terminal, also can be the interaction between the terminal.

In order to make management more fine, hope to respectively transmit different data based on multiple links in the communication Correspondent Nodes. Namely, data transmission is based on the traffic flow. Thus the requirement of the traffic flow management is existing.

SUMMARY OF THE INVENTION

In view of this, this invention aims to provide management method and device for traffic flow, including establishing method and device for traffic flow, and change method and device for traffic flow.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

DETAILED DESCRIPTION OF THE EMBODIMENTS

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

Figure 1:
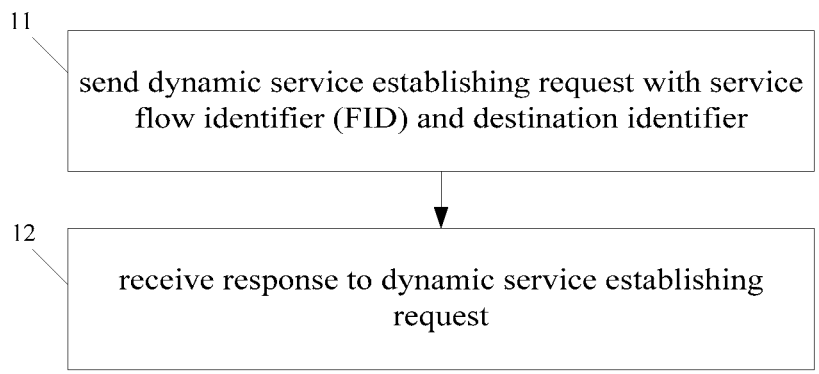
FIG. 1 is the flow chart indicating the establishing method for traffic flow specified in this invention.

FIG. 1 is the flow chart indicating the establishing method for traffic flow specified in this invention. The process includes:

Step 11: send dynamic service establishing request with traffic flow identifier (FID) and destination identifier.

Step 12: receive response to dynamic service establishing request.

Through Step 11~Step 12, establish traffic flow corresponding to the above FID, which can be uplink traffic flow or downlink traffic flow.

After the establishing of traffic flow, it's available to send traffic data via created traffic flow with corresponding FID; it's not required to carry destination identifier each time when sending data, but only use the above FID to guide data transmission.

Figure 2:
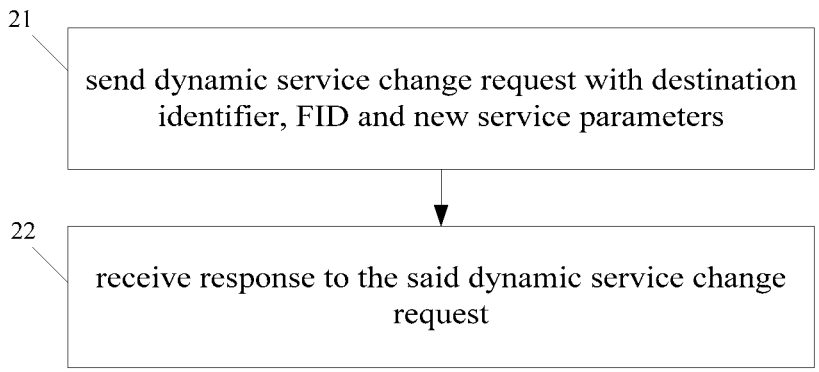
FIG. 2 is the flow chart indicating the change method for traffic flow specified in this invention.

FIG. 2 is the flow chart indicating the change method for traffic flow specified in this invention. The process includes:

Step 21: send dynamic service change request with destination identifier, FID and new service parameters.

According to new service parameters, it's available to change current service parameters corresponding to FID and destination identifier.

Step 22: receive response to the said dynamic service change request.

Through Step 21~Step 22, change traffic flow corresponding to the above FID, which can be uplink traffic flow or downlink traffic flow.

After modifying the traffic flow, it's available to send service data via modified traffic flow corresponding to the said FID; it's not required to carry destination identifier each time when sending data, but only use the above FID to guide data transmission.

Establishment of the above traffic flow and change of traffic flow are collectively referred to traffic flow management, wherein traffic flow change can be treated as establishing of traffic flow in special case, that is, establishing traffic flow with the original FID.

As can be seen, through traffic flow management, this invention creates or modifies the "connection" between request side and destination via FID identifier before data transmission; therefore, when data is transmitted via traffic flow between request side and destination, it's available to only use FID as identifier, without having to carry destination identifier in interaction with each data packet, which simplifies the operation.

Figure 3:
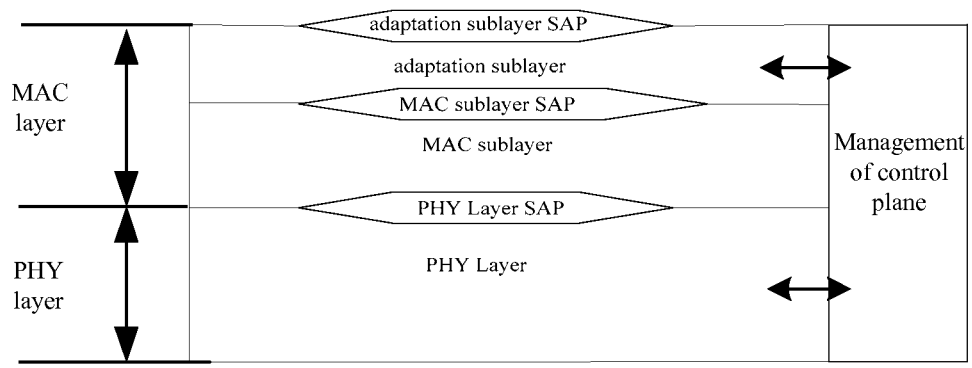
FIG. 3 is the reference model of a wireless communication system of enhanced ultra-high throughput wireless local area network (EUHT) system.

In the following embodiments, newly defined EUHT system at present is used as application background. FIG. 3 is a reference model of EUHT system.

The system reference model shown in FIG. 3 mainly refers to air interface reference model, including: media access control (MAC) layer and physical (PHY) layer. Main functions of each layer are summarized as follows:

① MAC layer includes adaptation sublayer and MAC sublayer.

Adaptation Sublayer: mainly include the functions of mapping and conversion between external network data and MAC service data unit (MSDU) in this part. MSDU mentioned here refers to the information delivered as a unit between MAC service access points (SAP). Specifically, adaptation sublayer has the following functions:

Receive service data unit (SDU) from upper layer;
Classify the SDU received from upper layer;
Send the PDU generated at adaptation sublayer to MAC sublayer;
Receive adaptation sublayer SDU from peer entity.

MAC sublayer: in addition to the function of media access control, it also provides the functions of system management and control, and support to specific features of PHY layer. Specifically, MAC sublayer has basic functions of management of control plane and data plane.

Management of control plane includes the following features:

System configuration: manage system configuration message, and interact system configuration information with terminal;

Wireless Resource management: mainly complete service scheduling function, assign resources based on service parameters and channel conditions, and functions such as load balancing, and access control;

Network-entry Management: responsible for initialization and access processes, and producing information required by access process, including: access code selection and capability negotiation, etc.;

Service Quality (QoS) Management: manage QoS parameters, and maintain the functions of establishing, change and deletion of each traffic flow;

Power Saving Management: manage to switch STA without service into sleep status, and switch from sleep status to activation status;

PHY layer control: mainly include the following sub-functions

Channel management: include channel switching, management of spectrum measurement and message report;

Multiple input and multiple output (MIMO) management: channel detection mechanism; and identification and selection of MIMO work modes;

Link self-adaption: channel quality information (CQI) measurement and feedback; MCS selection and feedback; power control and management.

Data plane includes the following features:

Automatic Repeat-request (ARQ): acknowledgement and retransmission operations for MPDU at MAC layer or fragmentation/aggregation MPDU;

Fragmentation/reassembly: according to the scheduling result, the sending end performs fragmentation processing on upper layer service data unit and then sends it to the next processing module, and the receiving end reassembles and recovers multiple fragments;

MPDU generation: package upper layer service unit into basic MAC frame, and send it to the next processing module;

MPDU aggregation: according to the scheduling result, the sending end performs aggregation operation on upper layer service data unit.

② PHY layer: mainly includes PHY transmission mechanism that maps MAC protocol data unit (MPDU) onto corresponding physical channel, such as orthogonal frequency division multiplexing (OFDM) and multiple input and multiple output (MIMO) technologies. Here MPDU refers to the data unit exchanged between two peer MAC entities using the PHY service.

Figure 4:
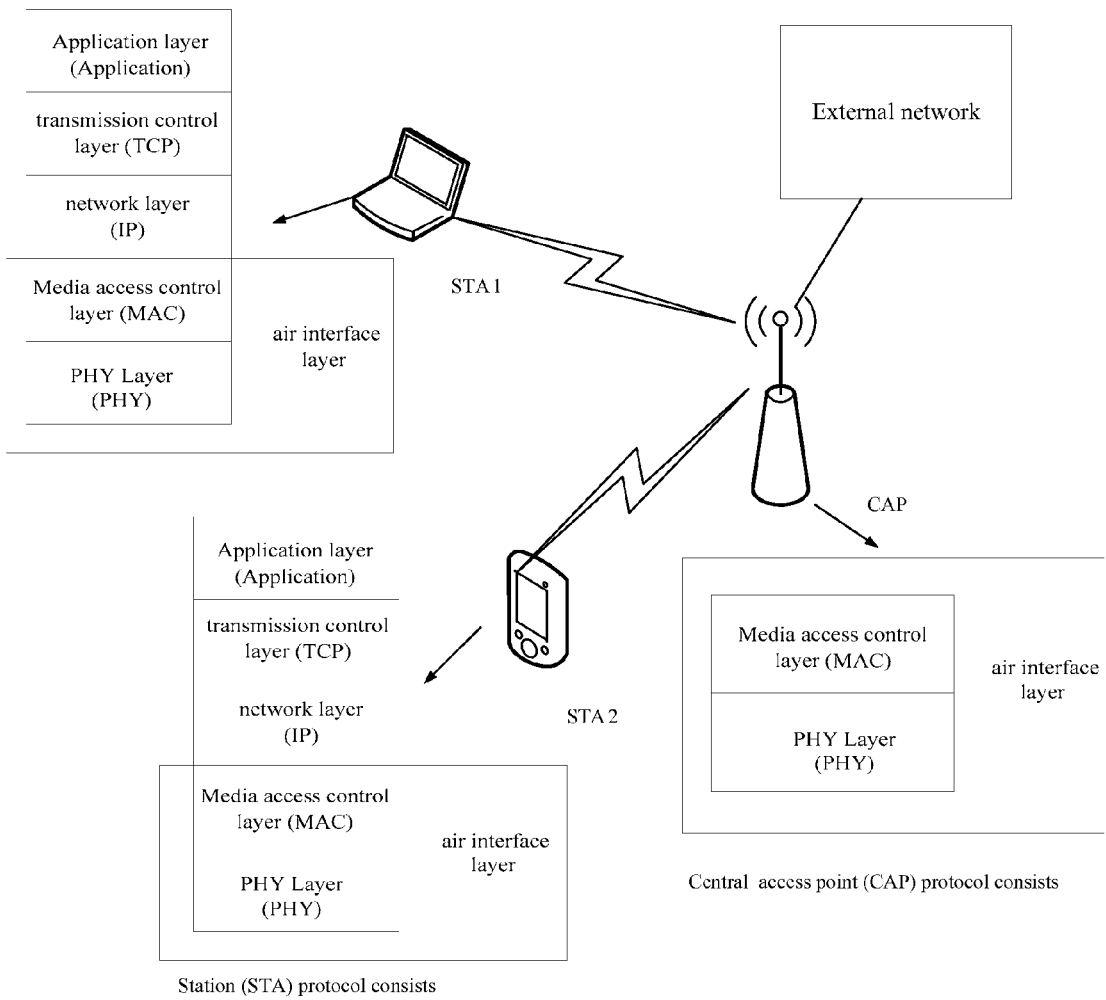
FIG. 4 shows components of access system of EUHT system.

FIG. 4 shows components of access system of EUHT system, including central access point (CAP) and station (STA), wherein STA can be for various data devices, such as: PDAs, laptops, cameras, mobile phones, tablets and pad and so on.

As shown in FIG. 2, STA1 and STA2 are connected to CAP via air interface protocol, and CAP establishes communication with existing external network (such as IP backbone network, Ethernet) via wired or wireless media. Wherein, CAP protocol consists of MAC layer and PHY layer. STA protocol consists of Application lay, transmission control (TCP) layer, network (IP) layer, MAC layer and PHY layer.

Figure 5:
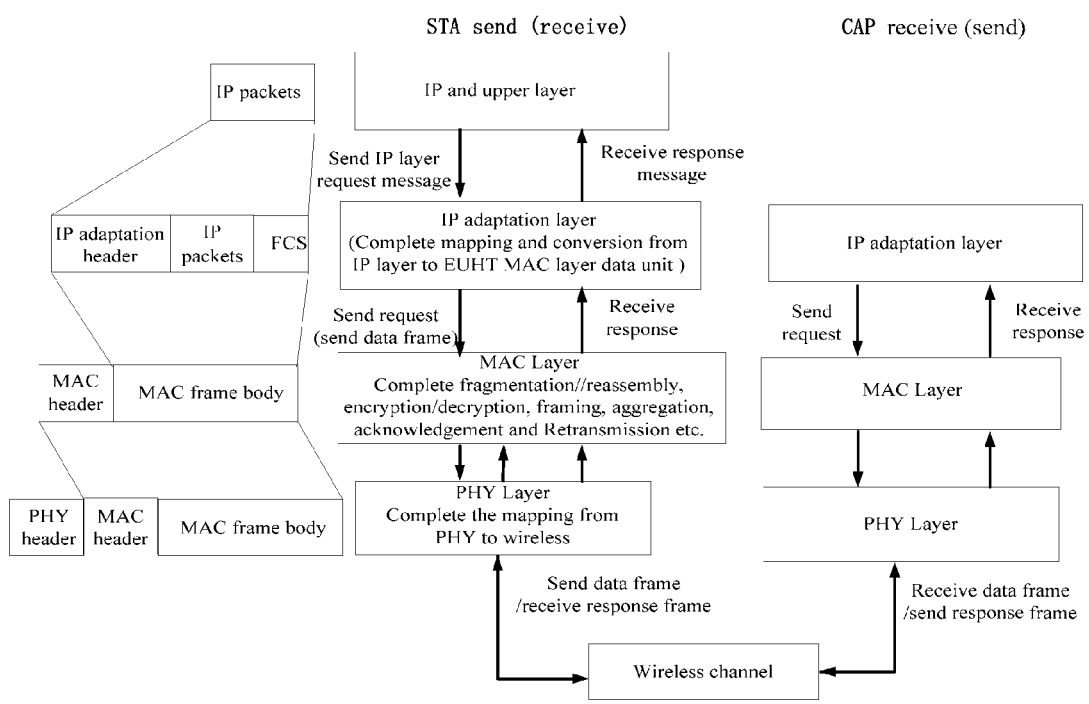
FIG. 5 shows the process of transmission and reception of protocol data between STA and CAP.

Based on the protocol composition shown in FIG. 4, FIG. 5 shows the process of transmission and reception of protocol data between STA and CAP, namely: when STA wants to send data to CAP, STA first has to process and package application data (such as VoIP, video, etc.) through application layer, TCP/IP layer, and sends it to adaptation sublayer in form of IP packets, which is converted, mapped and divided into traffic flows by adaptation sublayer, and then sent to MAC sublayer. Through fragmentation, encryption, framing, and aggregation and other operations, MAC sublayer sends data to PHY layer, and finally PHY maps to wireless channel for data transmission.

The connection between the request side and destination in this invention requires separate establish uplink and downlink traffic flows.

Figure 6:
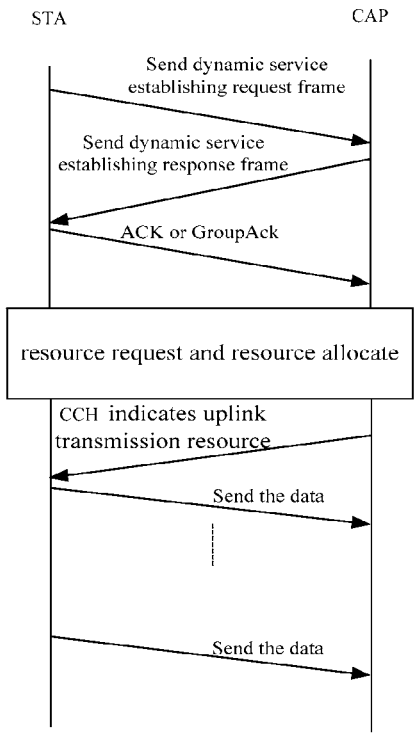
FIG. 6 is the flow chart indicating the methods of creating uplink traffic flow and sending data specified in the embodiment of this invention.

As an alternative embodiment, FIG. 6 is the flow chart indicating the methods of creating uplink traffic flow and sending data specified in the embodiment of this invention. The process includes:

Step 61: CAP receives dynamic service establishing request frame carried with FID and destination MAC address sent by STA.

In this embodiment, destination MAC address is used as destination identifier. Here destination can be either CAP, or other STA within CAP scope.

In this embodiment, dynamic service establishing request is realized by dynamic service establishing request frame.

Figure 7:
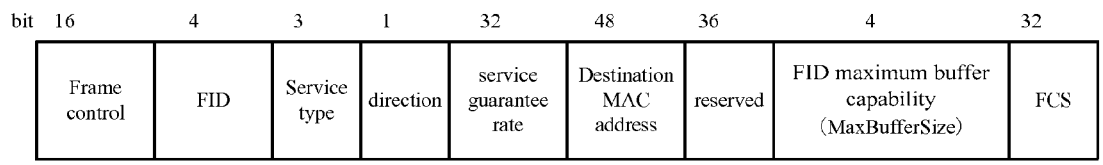
FIG. 7 is the structure diagram of dynamic service establishing request frame specified in the embodiment of this invention.

FIG. 7 is the structure diagram of dynamic service establishing request frame specified in the embodiment of this invention. The dynamic service establishing request frame includes: frame control field, FID field, service type field, direction field, service guarantee rate field, destination MAC address field, FID maximum buffer capability field, and FCS field. FIG. 7 also shows the examples of number of bits occupied by each field. The frames shown in FIG. 7, except for those of frame control field and FCS field, are known as frame body.

The meaning of each field shown in FIG. 7 is described below:

① the above frame control field includes identifier associated with the frame type, indicating that the frame is a dynamic service establishing request frame.

② the above FCS field is a checksum field.

③ the above FID field indicates FID.

④ the above service type field indicates the service type of the traffic flow to be created.

QoS parameters of traffic flow are as follows:

Service type, is a parameter uniquely identifying the type of service;

Service priority, is a parameter specifying the priority assigned to the traffic flow. For two given traffic flows, if all QoS parameters except for priority are the same, the traffic flow with higher priority will have lower latency and higher cache.

Service guarantee rate, is a parameter defining the basic rate to guarantee the service. The unit of this parameter is bits per second, and it matches the SDU input at IP adaptation layer. This parameter does not include MAC overhead.

Maximum service rate is a parameter describing the maximum service rate that the system can provide to the service, which can be used for rate shaping. Extra data exceeding this rate will be discarded by CAP. The unit of this parameter is bits per second, and it matches the SDU input at IP adaptation layer. This parameter does not include MAC overhead.

In this embodiment, the MAC layer defines eight service types according to QoS parameters of services, which can be further divided into categories, namely reserved resource class and non-reserved resource class, as shown in the following Table 1. Wherein, service types 1 to 4 belong to reserved resource class, the transmission rate of which will be guaranteed by the system; while service types 5 to 8 belong to non-reserved resource class, the transmission rate of which will not be guaranteed by the system.

TABLE 1

| Service Type | Resource Type | Priority | Delay Budget | Packet Loss Rate Budget | Service Examples |
|---|---|---|---|---|---|
| 0 | Reserved Resource | 2 | 100 ms | 10-2 | Voice conversation |
| 1 | | 4 | 150 ms | 10-3 | Video session (Real-time streaming service) |
| 2 | | 3 | 50 ms | 10-3 | Real-time games |
| 3 | | 5 | 300 ms | 10-6 | Non-session video (cached streaming service) |
| 4 | Non-Reserved Resource | 1 | 100 ms | 10-6 | Signaling |
| 5 | | 6 | 100 ms | 10-3 | Interactive game |
| 6 | | 7 | 300 ms | 10-6 | Video (cached streaming service) |
| | | | | | TCP-based service (e.g., WWW, FTP, P2P file sharing, etc.) |
| 7 | | 8 | 1000 ms | 10-6 | Background E-Mail receiving, file download, and file print, and other services with lower requirements on transmission time |

⑤ The above direction field indicates the traffic flow to be created is uplink traffic flow or downlink traffic flow. Through this field CAP can directly be informed of the direction of the traffic flow to be created.

⑥ The above service guarantee rate field indicates the basic rate of guaranteed service in bits per second. It matches the SDU input at IP adaptation layer. This parameter does not include MAC overhead. As the actual application may have many different types of services, such as voice service and real-time session specified in Table 1, through this field it can indicate the service guarantee rate of each service expected by STA, thus enhancing the flexibility of application. For service type corresponding to non-reserved resources listed in Table 1, STA can also report its expected service guarantee rate.

⑦ The above destination MAC address field indicates the destination MAC address. Through this field CAP can be directly informed of the destination corresponding to dynamic service establishing request. Here destination may be CAP itself, or another STA within the CAP scope.

⑧ The above FID maximum buffer capability field indicates the number of MPDUs with maximum CAP buffers expected by STA.

The above service type and service guarantee rate are collectively referred to service parameters.

Step 62: CAP sends dynamic service establishing response frame to STA.

In this embodiment, service establishing response is realized by dynamic service establishing response frame.

Figure 8:
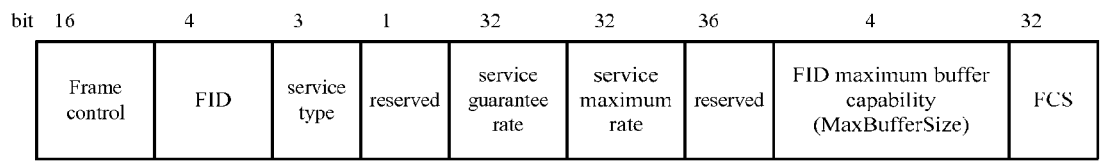
FIG. 8 is the structure diagram of dynamic service establishing response frame specified in the embodiment of this invention.

Corresponding to the dynamic service establishing request frame structure shown in FIG. 7, FIG. 8 shows the structure of dynamic service establishing response frame specified in the embodiment of this invention, including: frame control field, FID field, service type field, reservation field, service guarantee rate field, service maximum rate field, FID maximum buffer capability field and FCS field. FIG. 8 also gives examples of number of bits occupied by each field.

The meaning of each field listed in FIG. 8 is shown below:

① the above frame control field includes identifier related to frame type, which indicating that the frame is dynamic service establishing response frame.

② the above FCS field is a checksum field.

③ the above FID field has the same content with that of dynamic service establishing request frame.

④ the above service type field has the same content with that of dynamic service establishing request frame.

⑤ the above service guarantee rate field indicates the service guarantee rate value allowed by CAP. CAP can adjust the service guarantee rate in the dynamic service establishing request frame. The adjustment is mainly based on the adequacy of current resources to provide the service guarantee rate. For the service type of reserved resource, if current resources are limited and cannot guarantee the service guarantee rate reported in dynamic service establishing request frame, CAP can adjust the STA-reported service guarantee rate based on the actual situation. For the service type of non-reserved resource, regardless of whether STA reports service guarantee rate in dynamic service establishing request frame, CAP will directly adjust the STA-reported service guarantee rate to 0; however, when current resource provides said service guarantee rate to reserved resource service and has more remaining resources, CAP can assign resources for STA-requested services, and indicate assigned resources to STA.

For the service type of reserved resource, after STA parses the field, it's available to decide whether to continue the data transmission. Assuming that the parsed service guarantee rate is less than the reported service guarantee rate, STA may choose not to proceed with data transmission.

For service type of non-reserved resource, if CAP allocates resource, STA may choose to use the allocated resources for data transmission.

⑥ the service maximum rate field indicates the maximum service rate that can be provided by the system for requested service. It's for rate shaping. The extra data exceeding this rate will be discarded. The unit is bits per second, and it matches the SDU input at IP adaptation layer. This parameter does not include MAC overhead. The maximum service rate is preset value.

⑦ FID maximum buffer capability field indicates the maximum number of cached MPDUs in CAP. The value in this field can be the value reported in dynamic service establishing request frame, or the value adjusted by CAP according to actual situation.

CAP records FID, destination MAC address and corresponding service parameters, as well as maximum service rate and other information.

Further, after correctly receive dynamic service establishing response frame, STA can send acknowledgement to CAP; Specifically, STA can send ACK to CAP, or send group acknowledgement (GroupAck) to CAP. This invention embodiment provides a group acknowledgement method. The group acknowledgement frame includes management control frame indicator bit, and bitmap corresponding to different traffic flows of the same user. Here STA can fill in the above management control frame indicator bit the instruction that indicates whether the dynamic service establishing response frame is correctly received. During the follow-up data transmission based on traffic flow, STA can use the bitmap in the group acknowledgement frame to send the acknowledgements for different traffic flows to CAP.

Step 63: STA uses CAP-allocated uplink transmission resources to send data.

There are three ways to achieve this step:

1) by sending independent resource request, STA can request uplink transmission resources from CAP; Further, after CAP correctly receives independent resource request, it's available to send acknowledge to STA;

2) when CAP has sufficient resources, CAP can actively query each STA and allocate uplink transmission resource;

3) If STA currently has other service data transmission tasks, it's available to carry resource request in service data frame, and request uplink transmission resource from CAP; Further, after CAP correctly receives carried resource request, it's available to send acknowledgement to STA.

CAP indicates uplink transmission resource assigned to STA through control channel (CCH).

Through the above Step 61~Step 63, uplink traffic flows are created and data is sent based on the uplink traffic flows.

Figure 9:
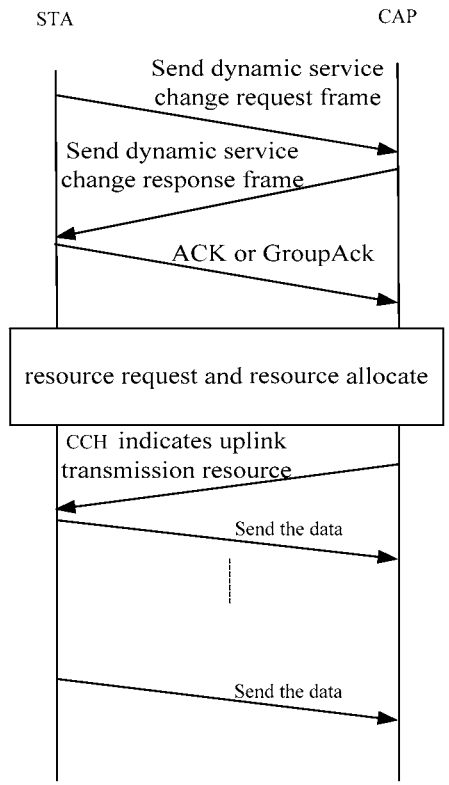
FIG. 9 is the flow chart indicating the methods of changing uplink traffic flow and sending data specified in the embodiment of this invention.

As an alternative embodiment, uplink traffic flow has similar change process as the above FIG. 6. FIG. 9 is the flow chart indicating the methods of modifying uplink traffic flow and sending data specified in this invention. The dynamic service change request frame includes the same fields as shown in FIG. 7, while dynamic service change response frame includes the same fields as shown in FIG. 8. When modifying uplink traffic flows, provided the FID and destination identifier carried in dynamic service change request frame are recorded by CAP, and what are carried in dynamic service change request frame are new service parameters, such as new service type and new service guarantee rate, CAP can, after receiving dynamic service change request frame, appropriately adjust new service parameters based on current resources. See above contents for adjustment method. Then CAP will change current service parameters corresponding to recorded FID and destination identifier to adjusted new service parameters, and carry modified service parameters in dynamic service change response frame and then send it to STA. When carrying new service parameters in dynamic service change request frame, the FID maximum buffer capability carried therein can either be a new value, or the original value.

Figure 10:
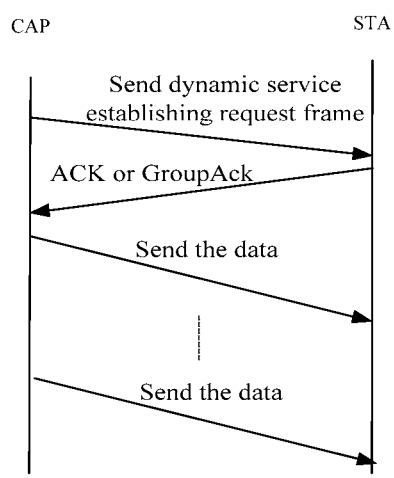
FIG. 10 is the flow chart indicating the methods of establishing downlink traffic flow and sending data specified in the embodiment of this invention.

As an alternative embodiment, FIG. 10 is the flow chart indicating the methods of creating downlink traffic flow and sending data specified in the embodiment of this invention. The process includes:

Step 101: STA receives the FID and destination MAC address carried in dynamic service establishing request frame and sent from CAP.

In this embodiment, dynamic service establishing request is realized by dynamic service establishing request frame.

In this step, dynamic service establishing request frame includes the same fields as shown in FIG. 7, and the contents in each field are almost the same, except that the FID maximum buffer capability field indicates the number of MPDUs with maximum STA buffers expected by CAP.

Here destination MAC address refers to the STA that receives dynamic service establishing request frame.

Step 102: STA sends ACK to CAP.

In this step, STA directly sends ACK to CAP, and saves FID and destination identifier and various parameters carried in dynamic service establishing request frame.

In this step, STA can also send GroupAck.

Step 103: STA receives the data sent from CAP, while be notified the downlink transmission resource that sends the data.

Through CCH, CAP can send data while indicating downlink transmission resources.

Through the above steps 101~103, downlink traffic flows are created and data is sent via downlink traffic flows.

Figure 11:
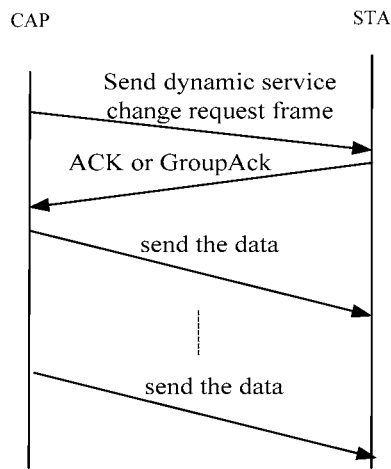
FIG. 11 is the flow chart indicating the methods of changing downlink traffic flow and sending data specified in the embodiment of this invention.

As an alternative embodiment, the change process for downlink traffic flows is similar with that specified in the above FIG. 10. FIG. 11 is the flow chart indicating the method to change downlink traffic flows in this invention. The dynamic service change request frame includes the same fields as shown in FIG. 7. However when modifying downlink traffic flows, provided the FID and destination identifier carried in dynamic service change request frame are recorded by STA, and what are carried in dynamic service change request frame are new service parameters, such as new service type and new service guarantee rate, STA will update various new service parameters corresponding to saved FID and destination identifier. When carrying new service parameters in dynamic service change request frame, the FID maximum buffer capability carried in dynamic service change request frame can be either a new value, or the original value.

An example of a method of this invention is shown below. Assuming that a CAP has multiple STAs, when two STAs require data transmission, it's available to use the method of this invention. Fox example, when STA1 and STA2 within the scope of CAP require data transmission, STA1 first creates uplink traffic flow with CAP. During the process of establishing uplink traffic flow, CAP is informed that the destination is STA2, and then it can establish downlink traffic flow with STA2. As CAP has cache capacity, when CAP creates downlink traffic flow with STA2, STA1 can send data to CAP; when downlink traffic flow is created, CAP forwards the data sent from cached STA1 to STA2. The process of STA2 sending data to STA1 is almost the same, i.e., first creating uplink traffic flow from STA2 to CAP; secondly, creating downlink traffic flow from CAP to STA1; then creating data to be sent from STA2 to STA1 via traffic flow.

The first traffic flow establishing device specified in this invention is located at the request side. And the request side can be either at the STA side, or at the CAP side.

Figure 12:
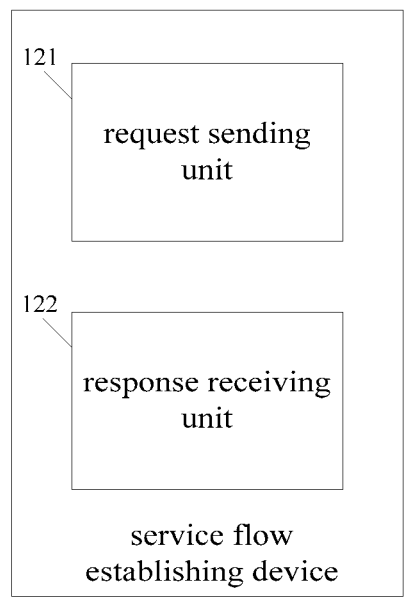
FIG. 12 shows the structure of the first traffic flow establishing device specified in this invention.

FIG. 12 shows the structure of the first traffic flow establishing device specified in this invention. The device includes: request sending unit 121 and response receiving unit 122.

Request sending unit 121 sends dynamic service establishing request carrying destination identifier and FID.

Response receiving unit 122 receives the response to dynamic service establishing request.

Figure 13:
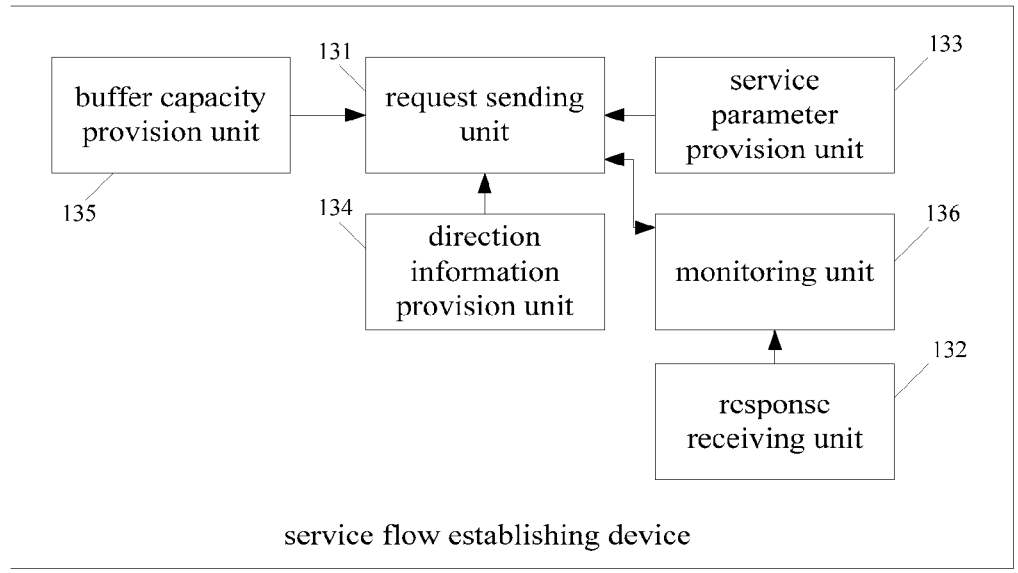
FIG. 13 shows the structure of the device shown in FIG. 12 when it is at the CAP side.

When the first traffic flow establishing device specified in this invention is at the CAP side, as an alternative embodiment, its structure is as shown in FIG. 13. The device includes: request sending unit 131, response receiving unit 132, service parameter provision unit 133, direction information provision unit 134, buffer capacity provision unit 135 and monitoring unit 136.

Request sending unit 131 sends dynamic service establishing request carrying destination identifier and FID.

Response receiving unit 132 receives the response to dynamic service establishing request. The response received by response receiving unit 132 to dynamic service establishing request is ACK or GroupAck.

Service parameter provision unit 133 is used to send service parameters to request sending unit 131 for further sending with dynamic service establishing request.

Direction information provision unit 134 is used to send the information indicating the direction of the traffic flow to be created and request sending unit 131. The unit 131 will further send it with dynamic service establishing request.

Buffer capacity provision unit 135 is used to provide FID maximum buffer capability to request sending unit 131, which will further send it with dynamic service establishing request. FID maximum buffer capability indicates the number of MPDUs of dynamic service establishing request with maximum cache at the receiving end.

Monitoring unit 136 is used to monitor response receiving unit 132 within preset number of frames after request sending unit 131 sends dynamic service establishing request. If response receiving unit 132 does not receive the said response, request sending unit 131 will be notified to re-send dynamic service establishing request. On this basis, request sending unit 131 will package and send dynamic service establishing request as MPDU. When re-sent dynamic service establishing request exceeds the maximum number of MPDU re-transmissions, the dynamic service establishing request will be discarded, and traffic flow deletion device will be informed to perform operations.

Figure 14:
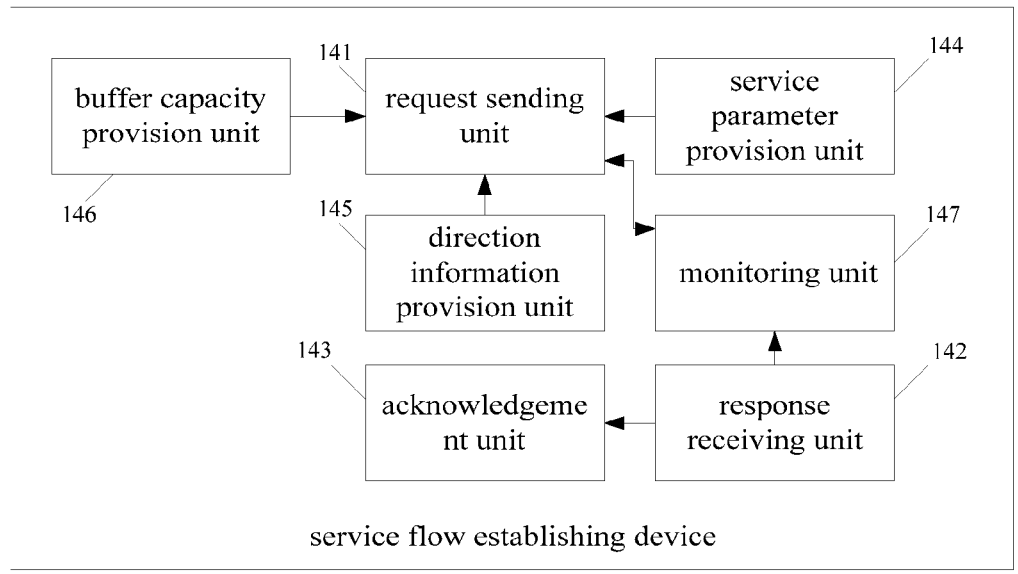
FIG. 14 shows the structure of the device shown in FIG. 12 when it is at the STA side.

When the first traffic flow establishing device specified in this invention is at the STA side, as an alternative embodiment, its structure is shown in FIG. 14. This device includes: request sending unit 141, response receiving unit 142, acknowledgement unit 143, service parameter provision unit 144, direction information provision unit 145, buffer capacity provision unit 146 and monitoring unit 147.

Request sending unit 141 sends dynamic service establishing request carrying destination identifier and FID.

Response receiving unit 142 receives the response to dynamic service establishing request. The response to dynamic service establishing request received by response receiving unit 142 is dynamic service establishing response carrying the said FID. Further, the dynamic service establishing response received by response receiving unit 142 can also carry maximum service rate that can be provided by the system.

Acknowledgement unit 143 is used to send ACK or GroupAck that indicates whether dynamic service establishing response is correctly received.

Service parameter provision unit 144 is used to send service parameters to request sending unit 141, which will be further sent with dynamic service establishing request. On this basis, dynamic service establishing response can also carry adjusted service parameters.

Direction information provision unit 145 is used to send the information that indicates the direction of uplink or downlink traffic flows to be created to request sending unit 141, which will be further sent with dynamic service establishing request.

Buffer capacity provision unit 146 is used to provide FID maximum buffer capability to request sending unit 141, which will be further sent with dynamic service establishing request. The said FID maximum buffer capability indicates the number of MPDUs of the said dynamic service establishing request with maximum cache at the receiving end.

Monitoring unit 147 is used to monitor response receiving unit 142 after request sending unit 141 sends dynamic service establishing request within the preset number of frames; if response receiving unit 142 does not receive the said response, inform request sending unit 141 to end this process.

Alternatively, regardless of whether the first traffic flow establishing device specified in this invention is at the STA side or the CAP side, this device can further include: a data transmission unit, that is used to send service data via the traffic flow created with the said FID.

Alternatively, regardless of whether the first traffic flow establishing device specified in this invention is at the STA side or the CAP side, it can only include either of direction information provision unit and buffer capacity provision unit.

The second traffic flow establishing device specified in this invention is at the request receiving end, and the request receiving end can be either at the STA side, or at the CAP side.

Figure 15:
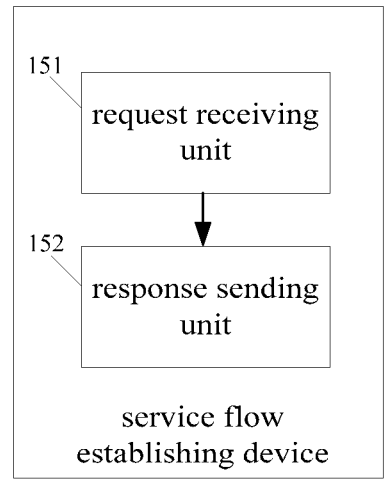
FIG. 15 shows the structure of the second traffic flow establishing device specified in this invention.

FIG. 15 is the structural diagram of the second traffic flow establishing device specified in this invention. This device includes: request receiving unit 151 and response sending unit 152.

Request receiving unit 151 is used to receive dynamic service establishing request carrying destination identifier and FID.

Response sending unit 152 is used to send the response to the said dynamic service establishing request.

When the second traffic flow establishing device specified in this invention is at the STA side, the dynamic service establishing request received by request receiving unit 151 can also carry service parameters. Response sending unit 152 sends ACK or GroupAck.

Figure 16:
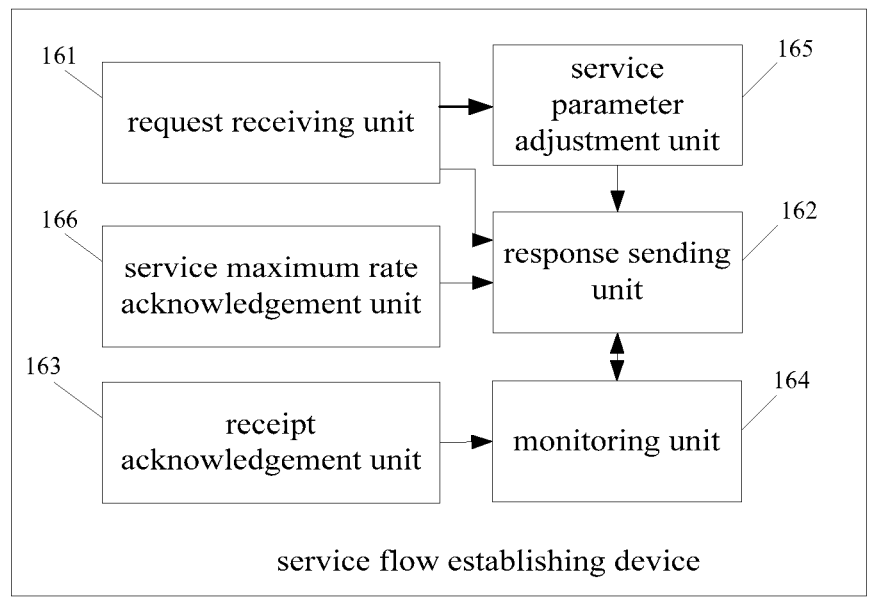
FIG. 16 shows the structure of the device shown in FIG. 15 when it is at the CAP side.

When the second traffic flow establishing device specified in this invention is at the CAP side, as an alternative embodiment, its structure is shown in FIG. 16. This device includes: request receiving unit 161, response sending unit 162, receipt acknowledgement unit 163, monitoring unit 164, service parameter adjustment unit 165 and service maximum rate acknowledgement unit 166.

Request receiving unit 161 is used to receive dynamic service establishing request carrying destination identifier and FID.

Response sending unit 162 is used to send the response to the said dynamic service establishing request. What is sent from response sending unit 162 is the dynamic service establishing response with the said FID.

Receipt acknowledgement unit 163 is used to receive ACK or GroupAck that indicates if the said dynamic service establishing response is correctly received.

Monitoring unit 164 is used to monitor receipt acknowledgement unit 163 after response sending unit 162 sends the said dynamic service establishing response within preset number of frames. If receipt acknowledgement unit 163 does not receive ACK or GroupAck, it will notify response sending unit 163 to re-send the said dynamic service establishing response. On this basis, response sending unit 162 will package and send dynamic service establishing response as MPDU. When the said re-send times exceed the maximum MPDU re-send times, discard dynamic service establishing response, and notify traffic flow deletion device to perform operations.

Service parameter adjustment unit 165 is used to adjust the service parameters carried in dynamic service establishing request, and send adjusted service parameters to response sending unit 162, which will be then sent with the said response.

Service maximum rate acknowledgement unit 166 is used to confirm the maximum service rate provided by the system, and send it to response sending unit 162, which will be then sent with the said response.

Alternatively, regardless of whether the second traffic flow establishing device specified in this invention is at the STA side or at the CAP side, it can further include: data transmission unit, that is used to receive the service data sent via the traffic flows created with the said FID.

Alternatively, regardless of whether the second traffic flow establishing device specified in this invention is at the STA side or at the CAP side, the dynamic service establishing request received at the request receiving unit can carry direction information and/or FID maximum buffer capability, wherein the said direction information indicates that the traffic flow to be created is uplink or downlink, and the said FID maximum buffer capability indicates the number of MPDUs of the said dynamic service establishing request with maximum cache at the receiving end.

The first traffic flow change device specified in this invention is at the request side. The request side can be located at the CAP side, or at the STA side.

Figure 17:
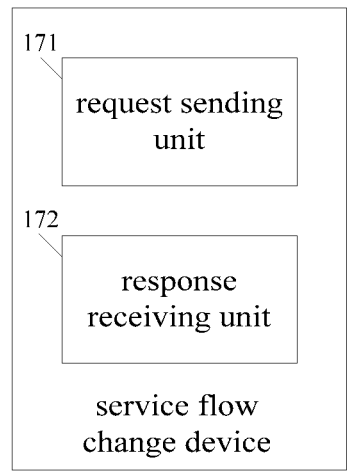
FIG. 17 shows the structure of the first traffic flow changing device specified in this invention.

FIG. 17 is the structural diagram of the first traffic flow change device specified in this invention. This device includes: request sending unit 171 and response receiving unit 172.

Request sending unit 171 sends dynamic service change request carrying destination identifier, FID and new service parameters.

Response receiving unit 172 receives dynamic service change response carrying the said FID.

Figure 18:
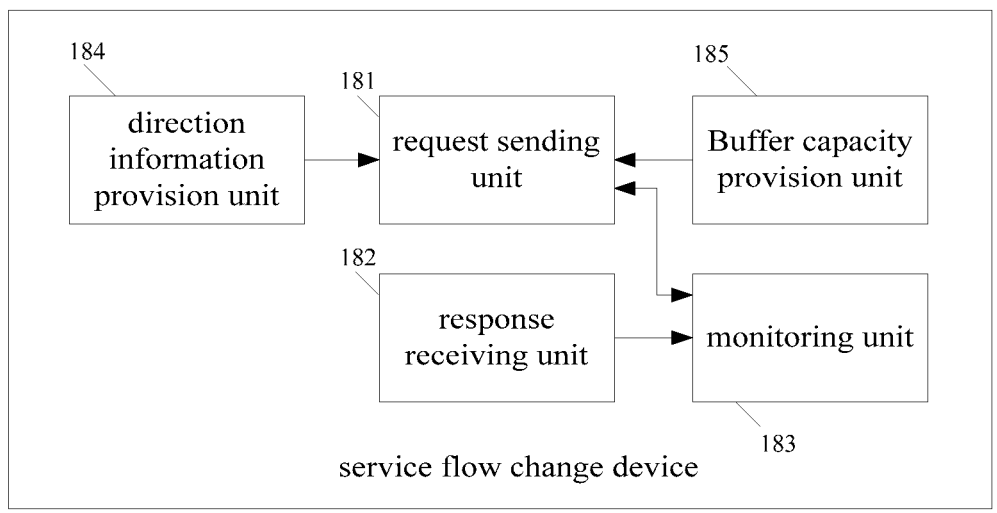
FIG. 18 shows the structure of the device shown in FIG. 17 when it is at the CAP side.

As an alternative embodiment, when the first traffic flow change device specified in this invention is at the CAP side, its structure is shown in FIG. 18. This device includes: request sending unit 181, response receiving unit 182, monitoring unit 183, direction information provision unit 184 and buffer capacity provision unit 185.

Request sending unit 181 sends dynamic service change request carrying destination identifier, FID and new service parameters.

Response receiving unit 182 receives dynamic service change response carrying the said FID. The response received by response receiving unit 182 is ACK or GroupAck.

Monitoring unit 183 is used to monitor response receiving unit 182 after request sending unit 181 sends dynamic service change request within the preset frame. If response receiving unit 182 does not receive the said response, notify request sending unit 181 to re-send dynamic service change request. On this basis, request sending unit 181 will package and send dynamic service change request as MPDU. When the re-sent dynamic service change request exceeds the Maximum MPDU re-send times, discard dynamic service change request, and notify traffic flow deletion device to perform operations.

Direction information provision unit 184 is used to send the direction information that indicates if the modified traffic flow is uplink or downlink to request sending unit 181, which will be further sent via dynamic service change request.

Buffer capacity provision unit 185 is used to provide FID maximum buffer capability to request sending unit 181, which will be sent with dynamic service change request. The said FID maximum buffer capability indicates the number of MPDUs with maximum cache expected by the said dynamic service change request at the receiving end.

Figure 19:
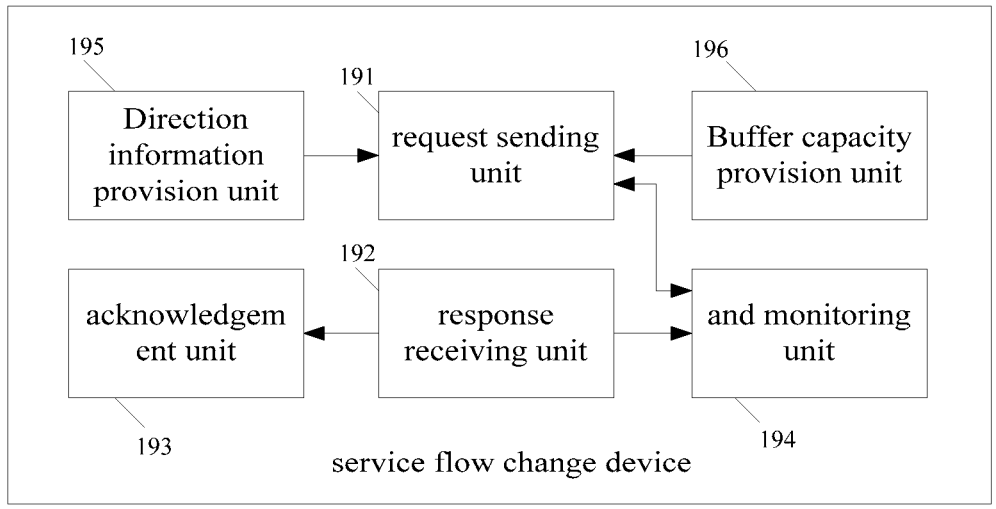
FIG. 19 shows the structure of the device shown in FIG. 17 when it is at the STA side.

As an alternative embodiment, when the first traffic flow change device specified in this invention is at the STA side, its structure is shown in FIG. 19. This device includes: request sending unit 191, response receiving unit 192, acknowledgement unit 193, and monitoring unit 194, Request sending unit 191 sends dynamic service change request carrying destination identifier, FID and new service parameters.

Response receiving unit 192 receives dynamic service change response carrying the said FID. The response received by response receiving unit 192 is dynamic service change response. Further, this dynamic service change response carries modified service parameters. Furthermore, this dynamic service change response carries the maximum service rate supported by the system.

Acknowledgement unit 193 is used to send ACK or GroupAck indicating if the said dynamic service change response is correctly received.

Monitoring unit 194 is used to monitor response receiving unit 192 after request sending unit 191 sends dynamic service change request within preset frame. If response receiving unit 192 does not receive the said response, notify request sending unit 191 to end this process.

Direction information provision unit 195 is used to send the direction information that indicates whether the modified traffic flow is uplink or downlink to request sending unit 191, which will be further sent via dynamic service change request.

Buffer capacity provision unit 196 is used to provide FID maximum buffer capability to request sending unit 191, which will be further sent via dynamic service change request; The said FID maximum buffer capability indicates the number of MPDUs with maximum cache expected by the said dynamic service change request at the receiving end.

Alternatively, regardless of whether the first traffic flow change device specified in this invention is at the CAP side or at the STA side, this device can also include: data transmission unit, that is used to send service data via the traffic flow with modified FID.

The second traffic flow change device specified in this invention is at the request receiving end, the request receiving end can be either at the STA side, or at the CAP side.

Figure 20:
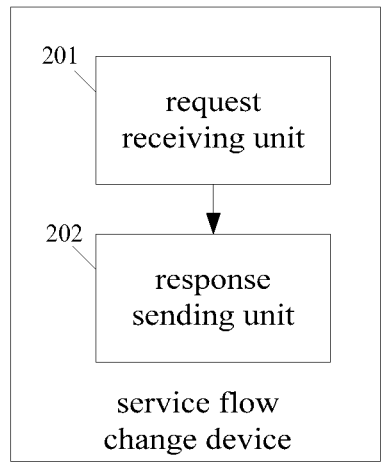
FIG. 20 shows the structure of the second traffic flow changing device specified in this invention.

FIG. 20 is the structural diagram of the second traffic flow change device specified in this invention. This device includes: request receiving unit 201 and response sending unit 202.

Request receiving unit 201 is used to receive dynamic service change request carrying destination identifier, FID and new service parameters.

Response sending unit 202 is used to send the response to the said dynamic service change request.

As an alternative embodiment, when the second traffic flow change device specified in this invention is at the STA side, the response sent from response sending unit 202 is ACK or GroupAck.

Figure 21:
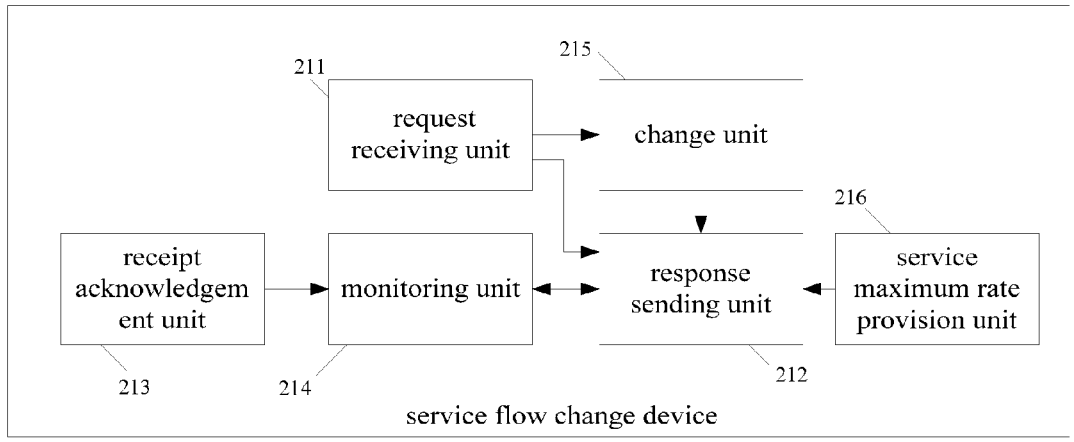
FIG. 21 shows the structure of the device shown in FIG. 20 when it is at the CAP side.

As an alternative embodiment, when the second traffic flow change device specified in this invention is at the CAP side, its structure is shown in FIG. 21. This device includes: request receiving unit 211, response sending unit 212, receipt acknowledgement unit 213, monitoring unit 214, change unit 215, and service maximum rate provision unit 216, Request receiving unit 211 is used to receive dynamic service change request carrying destination identifier, FID and new service parameters.

Response sending unit 212 is used to send the response to the said dynamic service change request. The response sent from response sending unit 212 is dynamic service change response carrying the said FID.

Receipt acknowledgement unit 213 is used to receive ACK or GroupAck that indicates whether dynamic service change response is correctly received.

Monitoring unit 214 is used to monitor receipt acknowledgement unit 213 after response sending unit 212 sends dynamic service change response within preset number of frames. If receipt acknowledgement unit 213 does not receive ACK or GroupAck, notify response sending unit 212 to re-send dynamic service change response. On this basis, response sending unit 212 will send dynamic service change response as MPDU. When the said re-send exceeds maximum MPDU re-send times, discard dynamic service change response, and notify traffic flow deletion device to perform operations.

Change unit 215 is used to determine reserved resource for the traffic flow to be modified according to new service parameters; adjust the said new service parameters according to the said reserved resource; change the current service parameters corresponding to the said FID and destination identifier according to the adjusted new service parameters, and send the modified service parameters to response sending unit 212, which will be further sent via dynamic service change response.

Service maximum rate provision unit 216 is used to confirm the maximum service rate supported by the system, and send to response sending unit 212, which will be then sent with the said response.

Alternatively, regardless of whether the second traffic flow change device specified in this invention is at the STA side or at the CAP side, this device can further include: data transmission unit, that is used to receive the service data sent on the traffic flows with modified FID.

Alternatively, regardless of whether the second traffic flow change device specified in this invention is at the STA side or at the CAP side, dynamic service change request received at request receiving unit can also carry direction information and/or FID maximum buffer capability; wherein, the said direction information indicates whether the traffic flow to be modified is uplink or downlink; the said FID maximum buffer capability indicates the number of MPDUs of the said dynamic service establishing request with maximum cache at the receiving end.

Alternatively, when the first traffic flow establishing device specified in this invention and the first traffic flow change device are at the STA side, this device can also include: resource request unit that is used to request uplink transmission resource for send service data.

Alternatively, when the first traffic flow establishing device specified in this invention and first traffic flow change device are at the STA side, this device can also include: resource acquisition unit that is used to acquire uplink transmission resource of send service data through active polling.

Alternatively, when the first traffic flow establishing device specified in this invention and the first traffic flow change device are at the CAP side, this device can also include: resource indication unit that is used to send the said service data, while indicating downlink transmission resource of send service data.

Alternatively, when the second traffic flow establishing device specified in this invention and the second traffic flow change device are at the CAP side, this device can also include: resource allocation unit is used to allocate uplink transmission resource of send service data according to the request.

Alternatively, when the second traffic flow establishing device specified in this invention and the second traffic flow change device are at the CAP side, this device can also include: polling unit is used to allocate uplink transmission resource of send service data through active polling.

Figure 22:
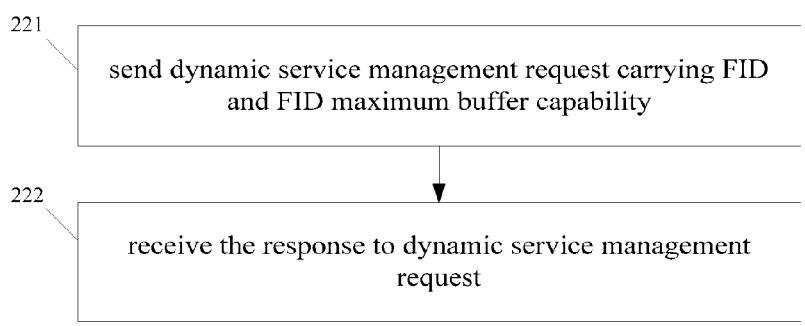
FIG. 22 is the flow chart indicating the management method for traffic flow specified in this invention.

This invention also provides a type of traffic flow management method. FIG. 22 is the flow chart indicating the traffic flow management method specified in this invention. The process includes:

Step 221: send dynamic service management request carrying FID and FID maximum buffer capability.

Here FID maximum buffer capability refers to the number of MPDUs of the receiving end with maximum buffer that is expected by the request side. The request side can be either CAP or STA.

Step 222: receive the response to dynamic service management request.

As can be seen, in the traffic flow management method provided in this invention, on the one hand it enables each traffic flow to have their respective buffer capacity, and finer and more flexible management; on the other hand, it support request traffic flow management whilst buffer capacity negotiation, which simplifies operation process.

As an alternative embodiment, traffic flow management method provided in this invention is traffic flow establishing method, including the following two situations:

First, uplink traffic flow establishing and data transmission methods include the following steps:

Step 1: CAP receives STA-sent dynamic service establishing request frame with FID and FID maximum buffer capability.

In this embodiment, dynamic service establishing request is realized by dynamic service establishing request frame.

The frame body of dynamic service establishing request frame specified in this step includes FID field and FID maximum buffer capability field, and can also include either or more of service type field, direction field, service guarantee rate field and destination MAC address field. These fields have the same meanings with the foregoing. The structures of all the above fields in the frame body are the same as that in FIG. 7.

Step 2: CAP sends dynamic service establishing response frame to STA.

The service establishing response specified in this embodiment is realized by dynamic service establishing response frame.

In the frame body of dynamic service establishing response frame specified in this step, in addition to FID field and FID maximum buffer capability field, it also includes either or more of service type field, service guarantee rate field and service maximum rate field. These fields have the same meanings with the foregoing. The structures of all the above fields in the frame body are the same as that in FIG. 8

The service parameters carried by dynamic service establishing response frame (through service type field and service guarantee rate field) can be service parameters adjusted by CAP for dynamic service establishing request frame. Detailed adjustment method is illustrated above.

The FID maximum buffer capability carried by dynamic service establishing response frame can be the same as that of dynamic service establishing request frame, or the FID maximum buffer capability of dynamic service establishing request frame as adjusted by CAP.

CAP records FID, destination MAC address and corresponding service parameters, service maximum rate and other information.

Further, STA can send ACK or GroupAck to CAP after correctly receiving dynamic service establishing response frame.

Through the above steps 1~2, it can not only complete uplink traffic flow establishing, but also negotiate the FID maximum buffer capability, which eliminates the need for separate negotiation of FID maximum buffer capability and simplifies the operation process.

Step 3: STA uses uplink transmission resource allocated by CAP to send data.

The change process of uplink traffic flow is similar to the above step 1~2, except that what is sent by STA is dynamic service change request frame with the same structure of dynamic service establishing request frame, and FID of dynamic service change request frame is recorded by CAP. According to the parameters in dynamic service change request frame, CAP updates the FID maximum buffer capability and/or service parameters corresponding to the recorded FID. Alternatively, CAP can adjust the FID maximum buffer capability and/or service parameters in dynamic service change request frame before the update operation.

Second, downlink traffic flow establishing and data transmission methods include the following steps:

Step 1': STA receive CAP-sent dynamic service establishing request frame carrying FID and FID maximum buffer capability.

In this embodiment, dynamic service establishing request is realized by dynamic service establishing request frame.

The frame body of dynamic service establishing request frame specified in this step includes FID field and FID maximum buffer capability field, and also includes either or more of service type field, direction field, service guarantee rate field and destination MAC address field. These fields have the same meanings with the foregoing. The structures of all the above fields in the frame body are the same as that in FIG. 7.

Step 2': STA sends ACK to CAP.

In this step, STA directly feeds back ACK to CAP, and saves FID and destination identifier as well as various parameters in dynamic service establishing request frame.

In this step, STA can also send GroupAck to CAP.

Through the above steps 1'~2', it can not only complete downlink traffic flow establishing, but also negotiate FID maximum buffer capability, which eliminate the need for separate negotiation of FID maximum buffer capability and simplifies the operation process.

Step 3': STA receives the data sent from CAP, and acquire the downlink transmission resource that sends the data.

The change process for downlink traffic flows is similar with the above Step 1'~2', except that what's sent by CAP is dynamic service change request frame with the same structure as dynamic service establishing request frame, and FID in dynamic service change request frame is recorded by STA. STA updates FID maximum buffer capability and/or service parameters corresponding to the recorded FID according to the parameters in dynamic service change request frame.

This invention also provides two types of traffic flow management devices.

Figure 23:
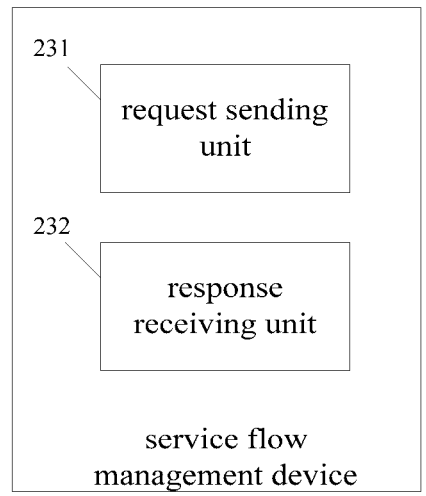
FIG. 23 shows the structure of the first traffic flow management device specified in this invention.

FIG. 23 is the structural diagram of the first traffic flow management device specified in this invention. This device is at the request side, including: request sending unit 231 and response receiving unit 232.

Request sending unit 231 is used to send dynamic service management request carrying traffic flow identifier FID and FID maximum buffer capability.

Response receiving unit 232 receives the response to dynamic service management request.

Figure 24:
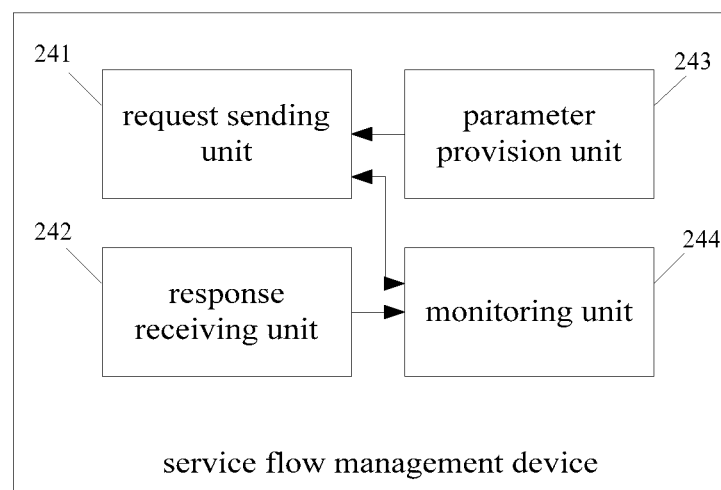
FIG. 24 shows the structure of the device shown in FIG. 23 when it is at the CAP side.

As an alternative embodiment, when the first traffic flow management device specified in this invention is at the CAP side, its structure is shown in FIG. 24. This device includes: request sending unit 241, response receiving unit 242, parameter provision unit 243 and monitoring unit 244.

Request sending unit 241 is used to send dynamic service management request carrying traffic flow identifier FID and FID maximum buffer capability.

Response receiving unit 242 receives the response to dynamic service management request. The response to dynamic service management request received by response receiving unit 242 is: acknowledgement that indicates if the said dynamic service management request is correctly receives.

Parameter provision unit 243 is used to send either or more of destination identifier, service parameters and direction information to request sending unit 241, which will carry and send via dynamic service management request. The said direction information indicates whether the traffic flow is uplink or downlink.

Monitoring unit 244 is used to monitor response receiving unit 242 after request sending unit 241 sends dynamic service management request within preset number of frames. If response receiving unit 242 does not receive the said response, notify request sending unit 241 to re-send dynamic service management request. On this basis, request sending unit 241 will package and send dynamic service management request as MPDU. When re-sent dynamic service management request exceeds the Maximum MPDU re-send times, discard dynamic service management request, and notify traffic flow deletion device to perform operations.

Figure 25:
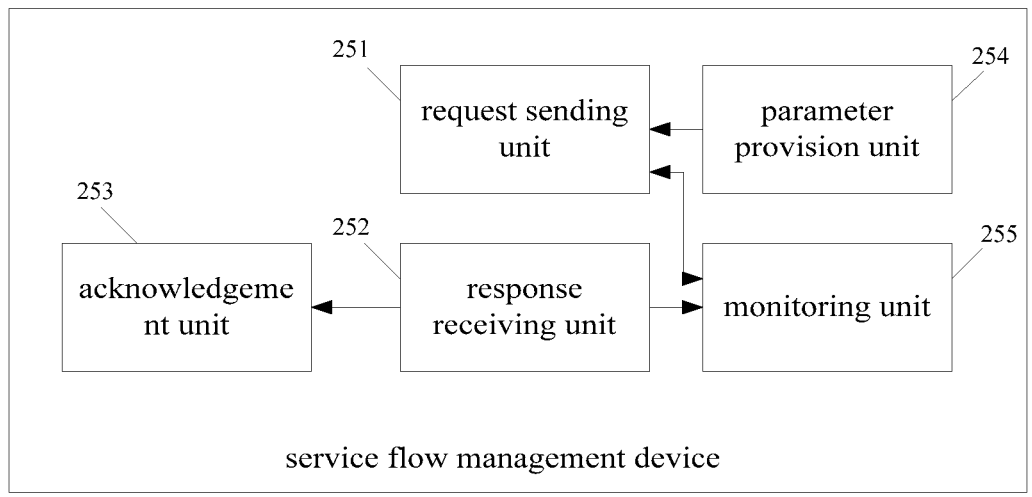
FIG. 25 shows the structure of the device shown in FIG. 23 when it is at the STA side.

As an alternative embodiment, when the first traffic flow management device specified in this invention is at the STA side, its structure is shown in FIG. 25. This device includes: request sending unit 251, response receiving unit 252, acknowledgement unit 253, parameter provision unit 254 and monitoring unit 255.

Request sending unit 251 is used to send dynamic service management request carrying traffic flow identifier FID and FID maximum buffer capability.

Response receiving unit 252 receives the response to dynamic service management request. the response to dynamic service management request received by response receiving unit 252 is: dynamic service management response carrying the said FID.

Acknowledgement unit 253 is used to send acknowledgement that indicates whether the said dynamic service management response is correctly received.

Parameter provision unit 254 is used to send either or more of destination identifier, service parameters and direction information to request sending unit 251, which will carry and send via dynamic service management request; wherein the said direction information indicates whether the traffic flow is uplink or downlink. On this basis, further, when dynamic service management request carries service parameters, dynamic service management response can also carry adjusted service parameters.

Monitoring unit 255 is used to monitor response receiving unit 252 after request sending unit 251 sends dynamic service management request within preset number of frames. If response receiving unit 252 does not receive the said response, notify request sending unit 251 to end this process.

Figure 26:
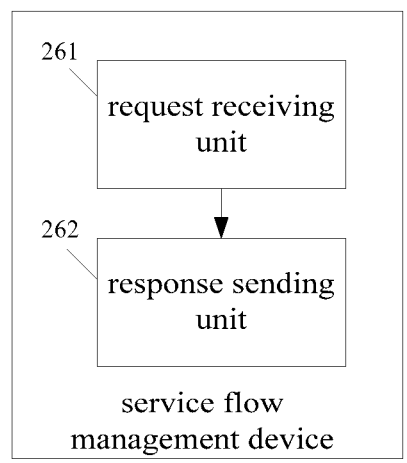
FIG. 26 shows the structure of the second traffic flow management device specified in this invention.

FIG. 26 is the structural diagram of the second traffic flow management device specified in this invention. This device is at the receiving end. This device includes: request receiving unit 261 and response sending unit 262.

Request receiving unit 261 is used to receive dynamic service management request carrying FID and FID maximum buffer capability.

Response sending unit 262 is used to send the response to dynamic service management request.

As an alternative embodiment, when traffic flow management device is at the STA side, the said response to dynamic service management request is: acknowledgement that indicates whether the said dynamic service management request is correctly received. On this basis, further, the said dynamic service management request also carries either or more of destination identifier, service parameters and direction information, including the said direction information that indicates whether the traffic flow to be created is uplink or downlink.

Figure 27:
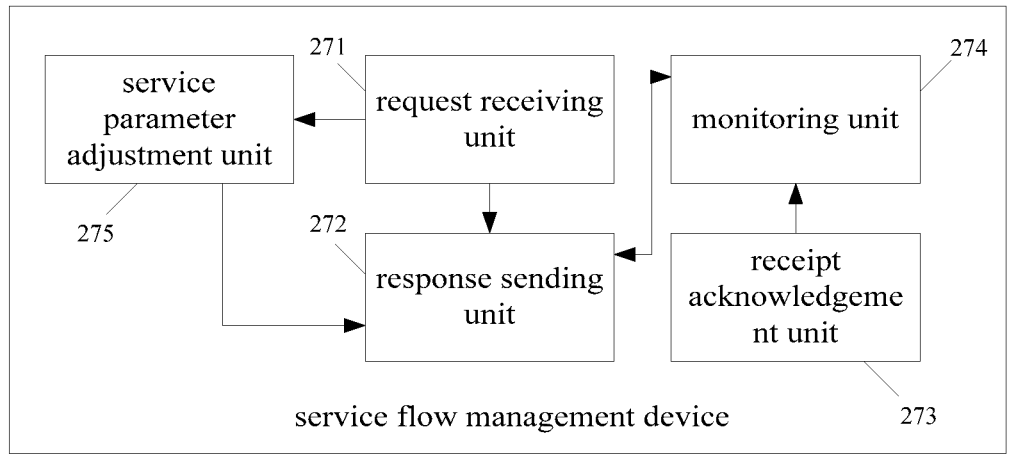
FIG. 27 shows the structure of the device shown in FIG. 26 when it is at the CAP side.

As an alternative embodiment, when traffic flow management device at the CAP side, its structure is shown in FIG. 27. This device includes: request receiving unit 271, response sending unit 272, receipt acknowledgement unit 273, monitoring unit 274 and service parameter adjustment unit 275.

Request receiving unit 271 is used to receive dynamic service management request carrying FID and FID maximum buffer capability.

Response sending unit 272 is used to send the response to dynamic service management request. The response to dynamic service management request sent by response sending unit 272 is: dynamic service management response carrying the said FID and FID maximum buffer capability.

Receipt acknowledgement unit 273 is used to receive acknowledgement that indicates whether the said dynamic service management response is correctly received.

Monitoring unit 274 is used to monitor receipt acknowledgement unit 273 after response sending unit 272 sends dynamic service management response within preset number of frames. If receipt acknowledgement unit 273 does not receive the said acknowledgement, trigger response sending unit 272 to re-send dynamic service management response. On this basis, response sending unit 272 will package and send dynamic service management response as MPDU. When the said re-send exceeds maximum MPDU re-send times, discard dynamic service management response, and notify traffic flow deletion device to perform operations.

The said dynamic service management request also carries either or more of destination identifier, service parameters and direction information. Service parameter adjustment unit 275 is used to, when dynamic service management request carries service parameters, confirm reserved resource according to the service parameters in dynamic service management request, adjust the service parameters in dynamic service management request according to the said reserved resource, and send adjusted service parameters to response sending unit 272, which will then send with dynamic service management response.

Figure 28:
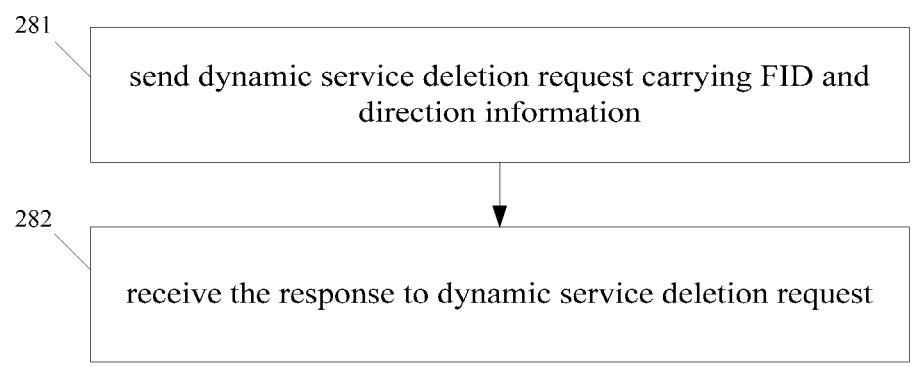
FIG. 28 is the flow chart indicating the method to delete the traffic flow specified in this invention.

This invention also provides a type of traffic flow deletion method. FIG. 28 is the flow chart indicating the method to delete the traffic flow specified in this invention. The process includes:

Step 281: send dynamic service deletion request carrying FID and direction information; direction information indicates whether the traffic flow to be deleted is uplink traffic flow or downlink traffic flow.

The sending end of dynamic service deletion request can be either STA or CAP, wherein in the dynamic service deletion request sent from STA, direction information indicates uplink traffic flow, while in dynamic service deletion request sent from CAP, direction information can either indicate uplink traffic flow, or downlink traffic flow.

Step 282: receive the response to dynamic service deletion request.

As can be seen, through the direction information carried in dynamic service deletion request, this invention enables CAP to not only delete its downlink traffic flow after completion of its service transmission, but also actively delete STA-related uplink traffic flow, thus avoiding long-time occupation of traffic flow resources by STA in case of no service for a long time or in case of exception. In addition, STA can delete its uplink traffic flow after completion of service transmission.

Figure 29:
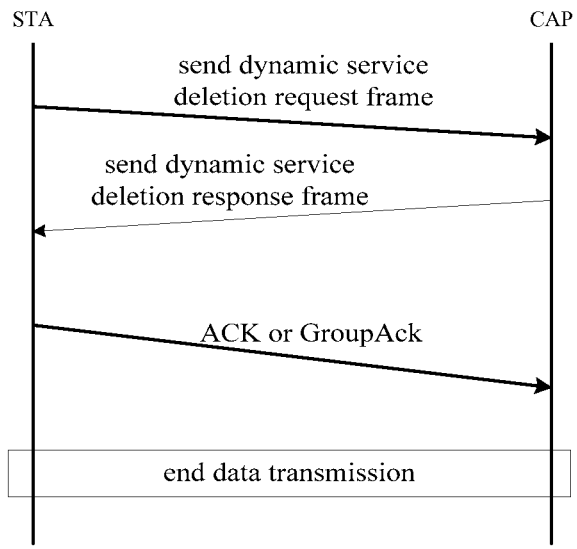
FIG. 29 is the flow chart indicating the method to delete the uplink traffic flow specified in this invention.

As an alternative embodiment, FIG. 29 is the flow chart indicating the method to delete the uplink traffic flow specified in this invention. The process includes:

Step 291: CAP receives dynamic service deletion request carrying FID and direction information frame sent from STA.

In this embodiment, dynamic service deletion request is realized by dynamic service deletion request frame.

Figure 30:
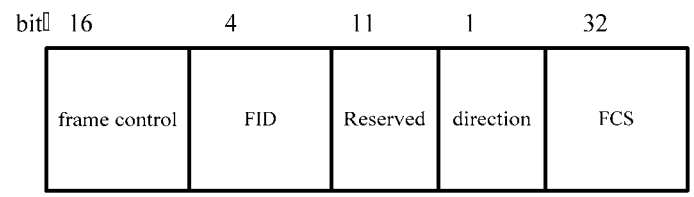
FIG. 30 shows the structure of dynamic service deleting request frame specified in the embodiment of this invention.

FIG. 30 shows the structure of dynamic service deletion request frame specified in the embodiment of this invention. The dynamic service deletion request frame includes frame control field, FID field, direction field and FCS field. Wherein the identifier in frame control field which is related to frame type indicates that the frame is dynamic service deletion request frame, FID field indicates the FID of the traffic flow to be deleted, direction field indicates that the traffic flow to be deleted is uplink traffic flow, and FCS field is a checksum field. FIG. 30 also illustrates the number of bits occupied by each field.

Step 292: CAP sends dynamic service deletion response frame to STA.

The structure of dynamic service deletion response frame is the same as dynamic service deletion request frame, and each field has the same contents.

Step 293: CAP receives ACK that is sent after STA correctly receives dynamic service deletion response frame.

In this step, STA can also send GroupAck to CAP.

Through the above steps 291~293, CAP and STA will respectively delete recorded FID and related information, and end the data transmission on deleted traffic flow.

Figure 31:
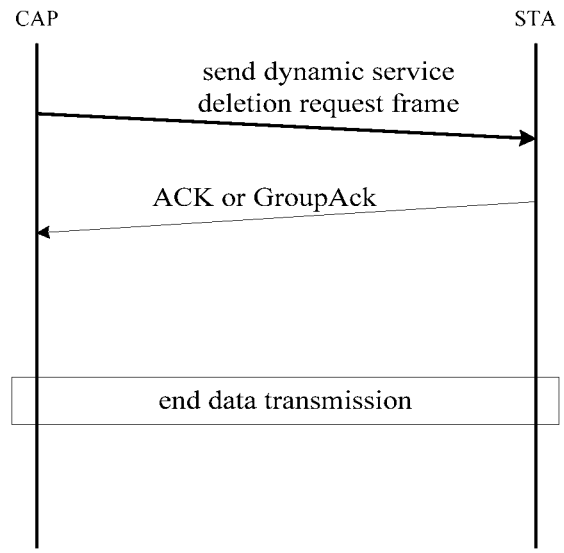
FIG. 31 is the flow chart indicating the method to delete the uplink or downlink traffic flow specified in this invention.

As an alternative embodiment, FIG. 31 is the flow chart indicating the method to delete the uplink or downlink traffic flow specified in this invention. The process includes:

Step 311: STA receives CAP-sent dynamic service deletion request carrying FID and direction information frame.

In this embodiment, dynamic service deletion request is realized by dynamic service deletion request frame. Here, the structure of dynamic service deletion request frame is the same as shown in FIG. 25, except that when CAP deletes downlink traffic flow, direction field indicates the downlink traffic flow, and when CAP deletes uplink traffic flow, direction field indicates the uplink traffic flow.

Step 312: STA sends ACK to CAP.

In this step, STA can also send GroupAck to CAP.

Through the above steps 311~312, CAP and STA will respectively delete recorded FID and related information, and end data transmission on deleted traffic flow.

This invention also provides two types of traffic flow deletion devices.

Figure 32:
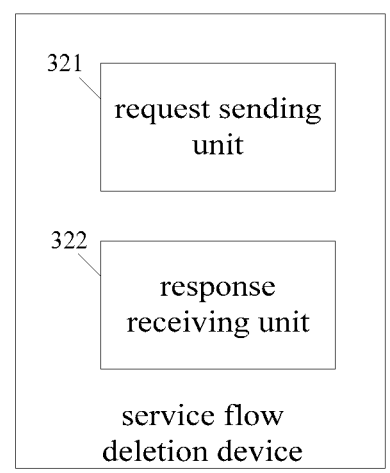
FIG. 32 shows the structure of the deleting device for the first traffic flow specified in this invention.

FIG. 32 shows the structure of the first traffic flow deletion device specified in this invention. This device includes: request sending unit 321 and response receiving unit 322.

Request sending unit 321 is used to send dynamic service deletion request carrying FID and direction information. Direction information indicates that the traffic flow to be deleted is uplink or downlink.

Response receiving unit 322 is used to receive the response to dynamic service deletion request.

Figure 33:
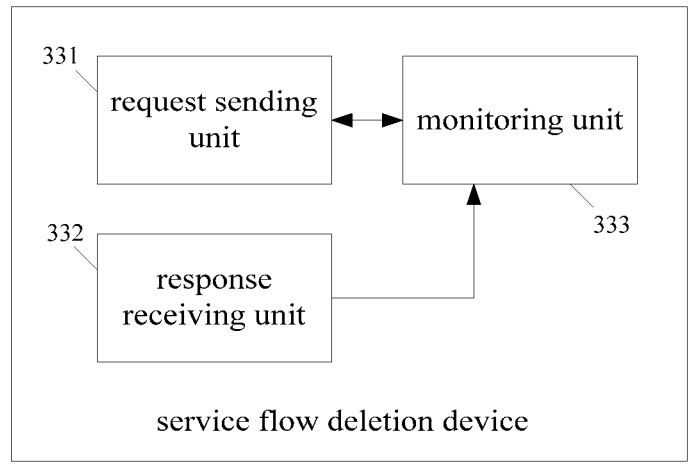
FIG. 33 shows the structure of the device shown in FIG. 32 when it is at the CAP side.

As an alternative embodiment, when the first traffic flow deletion device of this invention is at the CAP side, its structure is shown in FIG. 33. This device includes: request sending unit 331, response receiving unit 332 and monitoring unit 333.

Request sending unit 331 is used to send dynamic service deletion request carrying FID and direction information. Direction information indicates that the traffic flow to be deleted is uplink or downlink.

Response receiving unit 332 is used to receive the response to dynamic service deletion request. The response to dynamic service deletion request received by response receiving unit 332 is: acknowledgement indicating that the said dynamic service deletion request is correctly received.

Monitoring unit 333 is used to monitor response receiving unit 332 after request sending unit 331 sends dynamic service deletion request within preset number of frames. If response receiving unit 332 does not receive the said response, trigger request sending unit 331 to re-send dynamic service deletion request. On this basis, request sending unit 331 will package and send dynamic service deletion request s MPDU. When re-send dynamic service deletion request exceeds maximum MPDU re-send times, discard dynamic service deletion request.

As an alternative embodiment, when the first traffic flow deletion device of this invention is at the CAP side, it's available to receive notification regarding the two types of traffic flow establishing devices or two types of traffic flow change devices specified in this invention which are also at the CAP side, and start to perform operations.

As an alternative embodiment, when the first traffic flow deletion device of this invention is at the CAP side, it's available to receive notification regarding the two types of traffic flow management devices which are also at the CAP side, and start to perform operations.

As an alternative embodiment, when the first traffic flow deletion device of this invention is at the STA side, its structure is shown in FIG. 33, except that the response to dynamic service deletion request received by response receiving unit 332 is dynamic service deletion response carrying the said FID and direction information, and when monitoring unit 333 does not receive the said response at response receiving unit 332, it will notify request sending unit 331 to end this process.

Figure 34:
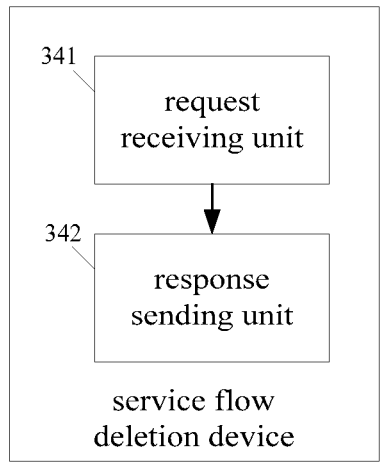
FIG. 34 shows the structure of the second traffic flow deleting device specified in this invention.

FIG. 34 is structural diagram of the second traffic flow deletion device in this invention. This device includes: request receiving unit 341 and response sending unit 342.

Request receiving unit 341 is used to receive dynamic service deletion request carrying FID and direction information. Direction information indicates that the traffic flow to be deleted is uplink or downlink.

Response sending unit 342 is used to send the response to dynamic service deletion request.

Figure 35:
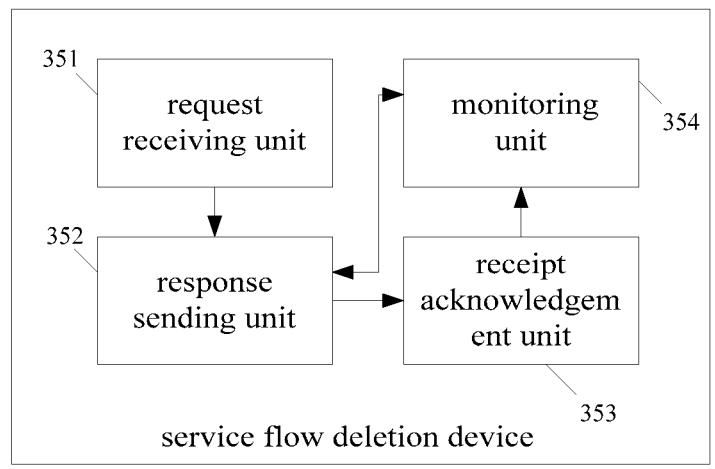
FIG. 35 shows the structure of the device shown in FIG. 34 when it is at the CAP side.

As an alternative embodiment, when traffic flow deletion device is at the CAP side, its structure is shown in FIG. 35. This device includes: request receiving unit 351, response sending unit 352, receipt acknowledgement unit 353 and monitoring unit 354.

Request receiving unit 351 is used to receive dynamic service deletion request carrying FID and direction information. Direction information indicates that the traffic flow to be deleted is uplink or downlink.

Response sending unit 352 is used to send the response to dynamic service deletion request. The response to dynamic service deletion request is: dynamic service deletion response carrying the said FID and direction information.

Receipt acknowledgement unit 353 is used to receive acknowledgement indicating that the said dynamic service deletion response is correctly received.

Monitoring unit 354 is used to monitor receipt acknowledgement unit 353 after response sending unit 352 sends dynamic service deletion response within preset number of frames. If receipt acknowledgement unit 353 does not receive the said acknowledgement, trigger response sending unit 352 to re-send the said dynamic service deletion response. On this basis, response sending unit 352 will package and send dynamic service deletion response as MPDU. When the said re-send exceeds maximum MPDU re-send times, discard the said dynamic service deletion response.

Alternatively, when the traffic flow deletion device is at the STA side, the said response to dynamic service deletion request is: acknowledgement indicating that the said dynamic service deletion request is correctly received.

The following describes how this invention handles exceptions in traffic flow management.

Exception handing may use the following system setting parameters:

1, maximum waiting interval of traffic flow response frame: indicate the tolerable maximum number of frames to wait after STA sends traffic flow management request frame. As an example, default value can be set to 4;

2, maximum waiting frame interval for acknowledgement of downlink traffic flow request frame: indicate tolerable maximum number of frames to wait after CAP sends traffic flow management request frame. As an example, default value can be set to 4;

3, maximum waiting frame interval for acknowledgement of traffic flow response frame: indicate tolerable maximum number of frames to wait after CAP sends traffic flow management response frame. As an example, default value can be set to 4;

4, Maximum MPDU re-send times: indicate maximum times for re-sending certain MPDU. As an example, default value can be set to 5;

5, STA's maximum number of consecutive failure times allowed by CAP: indicate the number of failure times of certain STA allowable by CAP. As an example, default value can be set to 20.

In the traffic flow management, this invention has the following exception handling measures:

1, for uplink traffic flow management, when at the STA side, after sending request frame STA waits for "maximum waiting interval of traffic flow response frame". If it does not receive CAP-sent response frame, it's deemed that this traffic flow management process fails, and STA will launch another new traffic flow management process. When at the CAP side, after sending response frame CAP waits for "maximum waiting frame interval for acknowledgement of traffic flow response frame". If it does not receive ACK or GroupAck sent from STA, re-send response frame until the number of resends exceeds maximum MPDU re-send times. At this time CAP will initiate the traffic flow deletion process.

2, for downlink traffic flow management, after sending request frame CAP waits for "maximum waiting frame interval for acknowledgement of downlink traffic flow request frame". If it does not receive ACK or GroupAck sent from STA, it's deemed that this traffic flow management process fails, and re-send the request frame until the number of re-sends exceeds maximum MPDU re-send times. At this time CAP will initiate the traffic flow deletion process.

3, during the above exception handling process, after CAP sends MPDU or group MAC protocol data unit (G-MPDU) to STA, if no proper acknowledgement of any MPDU is received, it's deemed as failure and failure counter will be started. If the subsequent MPDU or G-MPDU sent to the STA still fails, it will accumulate the number of failures. If any proper acknowledgement of any MPDU is received, the counter will be cleared. If the accumulative value exceeds the "maximum number of sending failures of STA allowable by CAP", CAP will deem that the STA has exception, and will remove it from the list of active STAs.

When the above CAP sends MPDU to STA, it can be that CAP packages the response frame or request frame of certain traffic flow of STA as MPDU and send it to STA.

When the above CAP sends G-MPDU to STA, it can be that CAP sends response frame or request frame of traffic flow 1 for STA, and sends together with the data frame of traffic flow 2 to STA.

In exception handling method, this invention uses frame number for timing, which is more precise than that of timer.

Figure 36:
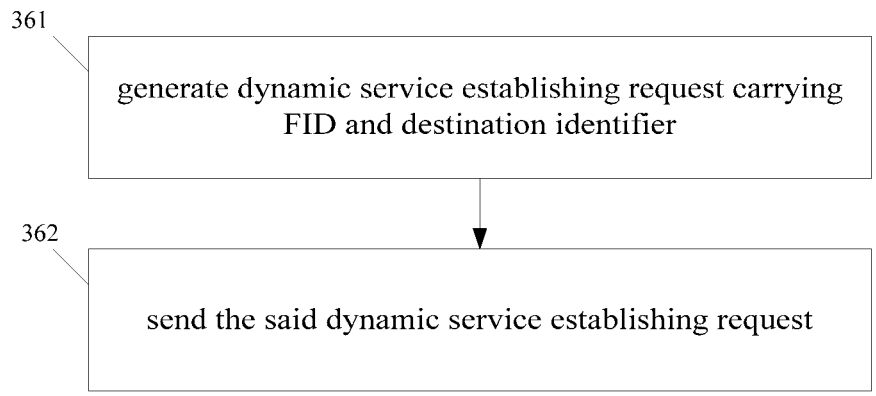
FIG. 36 is the flow chart indicating the first method to establish traffic flow specified in this invention.

This invention also provides a method for traffic flow establishing, as shown in FIG. 36. This method includes:

Step 361: generate dynamic service establishing request carrying FID and destination identifier;

Step 362: send the said dynamic service establishing request.

Figure 37:
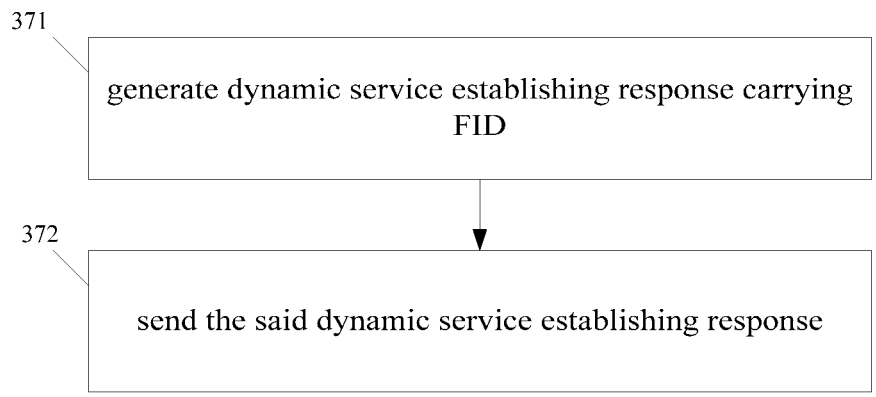
FIG. 37 is the flow chart indicating the second method to establish traffic flow specified in this invention.

This invention also provides another method for traffic flow establishing, as shown in FIG. 37. This method includes:

Step 371: generate dynamic service establishing response carrying FID;

Step 372: send the said dynamic service establishing response.

As an alternative embodiment, the above dynamic service establishing request may adopt the dynamic service establishing request frame as shown in FIG. 7. The above dynamic service establishing response may adopt the dynamic service establishing response frame shown in FIG. 8.

For the traffic flow establishing methods shown in FIGS. 36 and 37, this invention also provides two devices for traffic flow establishing, including generation unit and sending unit, wherein is used for generating the information to be generated in the generation step in relevant method, while the sending unit is used for sending the information generated in generation unit.

Figure 38:
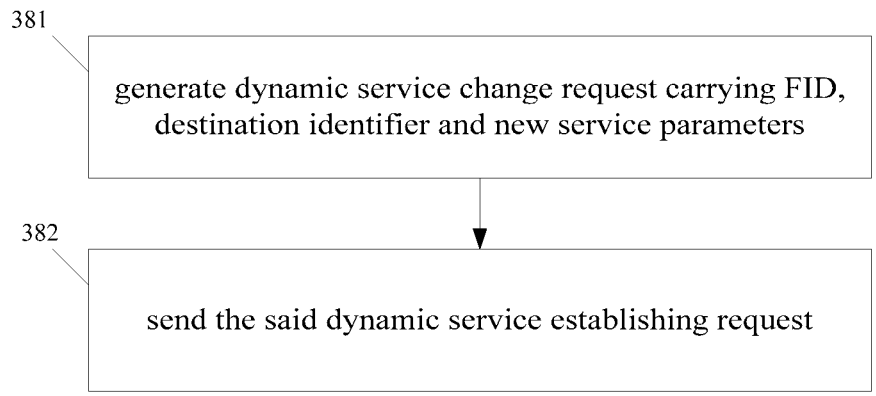
FIG. 38 is the flow chart indicating the first method to change traffic flow specified in this invention.

This invention also provides a method for traffic flow change, as shown in FIG. 38. This method includes:

Step 381: generate dynamic service change request carrying FID, destination identifier and new service parameters;

Step 382: send the said dynamic service establishing request.

Figure 39:
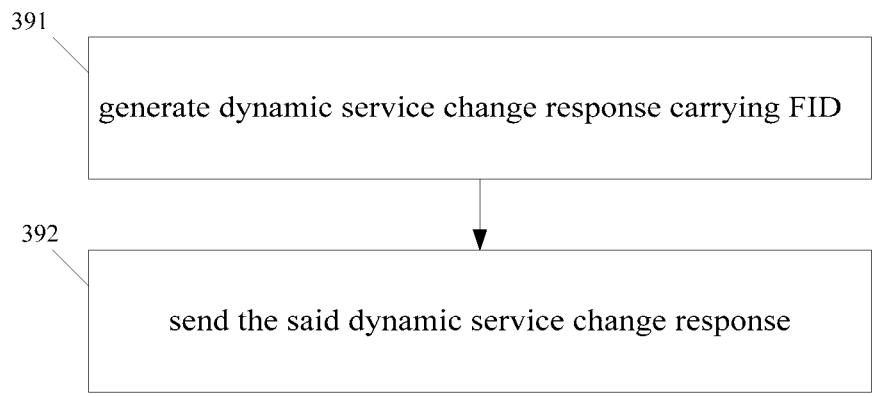
FIG. 39 is the flow chart indicating the second method to change traffic flow specified in this invention.

This invention also provides another method for traffic flow change, as shown in FIG. 39. This method includes:

Step 391: generate dynamic service change response carrying FID;

Step 392: send the said dynamic service change response.

As an alternative embodiment, the above dynamic service change request may adopt dynamic service change request frame with the same structure as shown in FIG. 7. The above dynamic service change response may adopt the dynamic service change response frame as shown in Figure.

For the methods for traffic flow change as shown in FIG. 38 and FIG. 39, this invention also provides two types of devices for traffic flow change, including generation unit and sending unit, wherein the generation unit is used for generating the information to be generated in the generation step in relevant method, while the sending unit is used for sending the information generated in generation unit.

Figure 40:
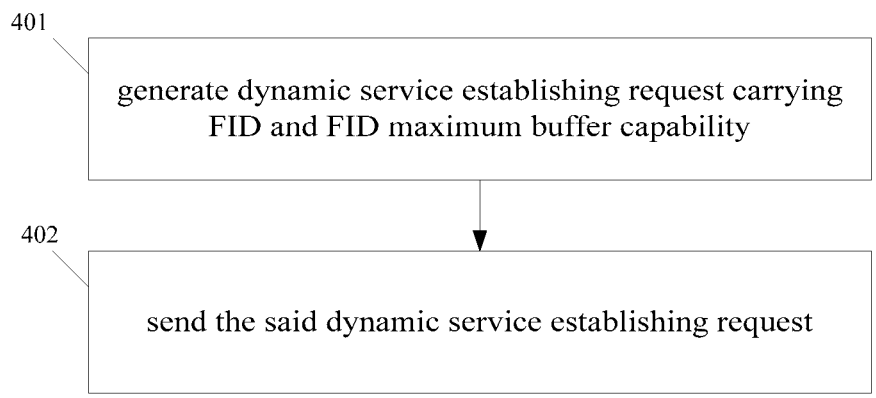
FIG. 40 is the flow chart indicating the third method to establish traffic flow specified in this invention.

This invention also provides a method for traffic flow establishing, as shown in FIG. 40. This method includes:

Step 401: generate dynamic service establishing request carrying FID and FID maximum buffer capability;

Step 402: send the said dynamic service establishing request.

Figure 41:
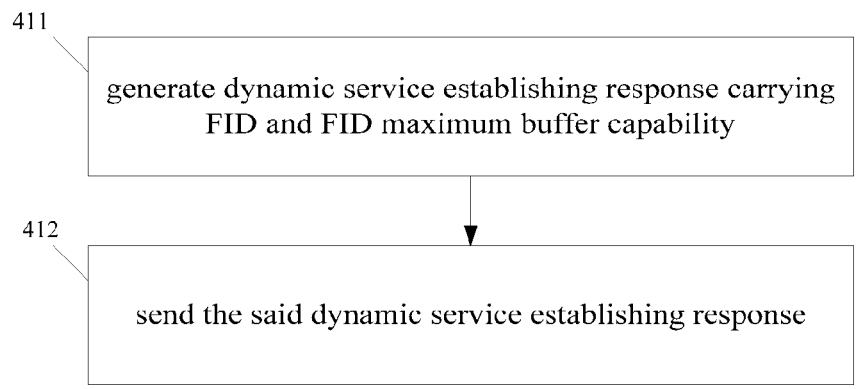
FIG. 41 is the flow chart indicating the fourth method to establish traffic flow specified in this invention.

This invention also provides another method for traffic flow establishing, as shown in FIG. 41. This method includes:

Step 411: generate dynamic service establishing response carrying FID and FID maximum buffer capability;

Step 412: send the said dynamic service establishing response.

As an alternative embodiment, the above dynamic service establishing request may adopt the dynamic service establishing request frame shown in FIG. 7; the above dynamic service establishing response may adopt the dynamic service establishing response frame shown in FIG. 8.

For the methods for traffic flow establishing shown in FIGS. 40 and 41, this invention also provides two types of devices for traffic flow establishing, including generation unit and sending unit, wherein generation unit is used for generating the information to be generated in the generation step in relevant method, while the sending unit is used for sending the information generated in generation unit.

Figure 42:
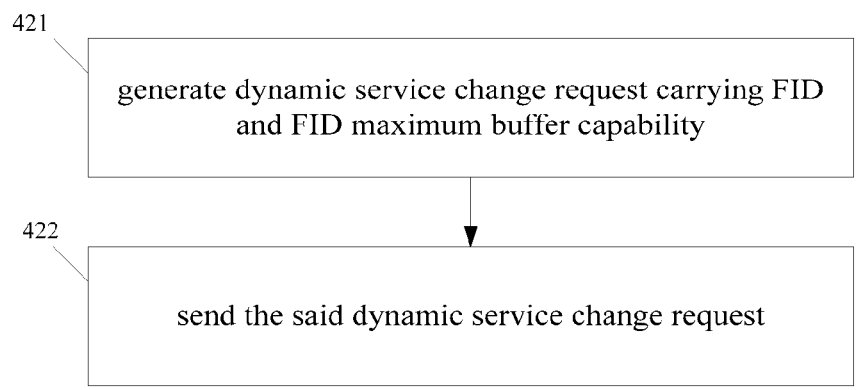
FIG. 42 is the flow chart indicating the third method to change traffic flow specified in this invention.

This invention also provides a method for traffic flow change, as shown in FIG. 42. This method includes:

Step 421: generate dynamic service change request carrying FID and FID maximum buffer capability;

Step 422: send the said dynamic service change request.

Figure 43:
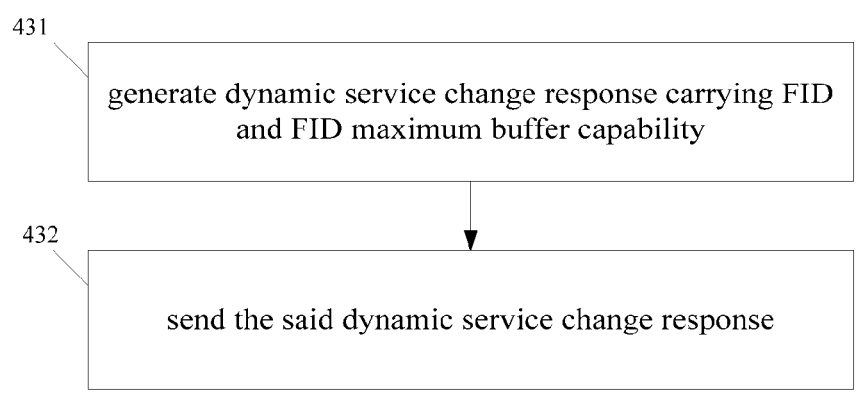
FIG. 43 is the flow chart indicating the fourth method to establish traffic flow specified in this invention.

This invention also provides another method for traffic flow change, as shown in FIG. 43. This method includes:

Step 431: generate dynamic service change response carrying FID and FID maximum buffer capability;

Step 432: send the said dynamic service change response.

As an alternative embodiment, the above dynamic service change request may adopt the dynamic service change request frame with the same structure as shown in FIG. 7, and the above dynamic service change response may adopt the dynamic service change response frame as shown in FIG. 8.

For the methods for traffic flow change shown in FIG. 42 and FIG. 43, this invention also provides two types of devices for traffic flow change, including generation unit and sending unit, wherein generation unit is used for generating the information to be generated in the generation step in relevant method, while the sending unit is used for sending the information generated in generation unit.

Figure 44:
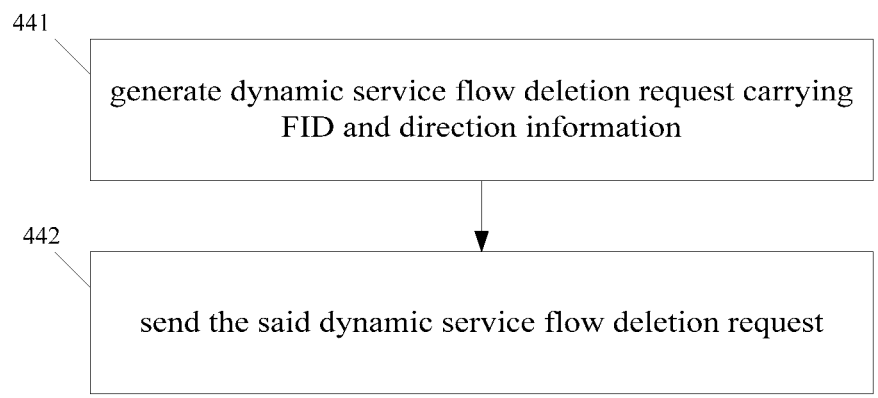
FIG. 44 is the flow chart indicating the first method to delete traffic flow specified in this invention.

This invention also provides a method for traffic flow deletion, as shown in FIG. 44. This method includes:

Step 441: generate dynamic traffic flow deletion request carrying FID and direction information;

Step 442: send the said dynamic traffic flow deletion request.

Figure 45:
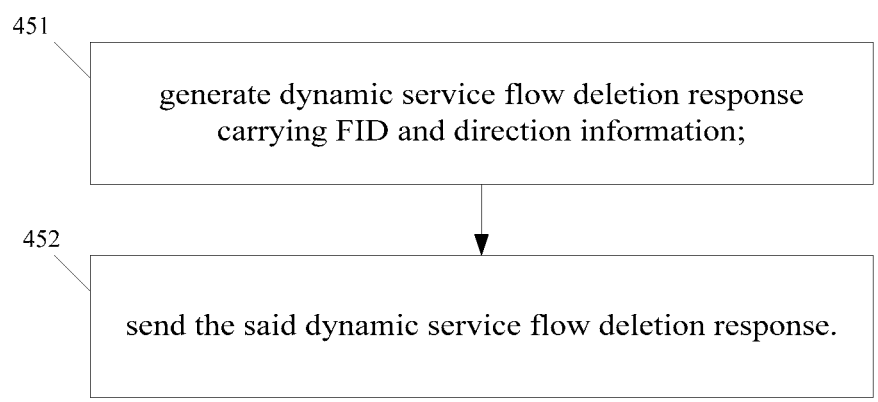
FIG. 45 is the flow chart indicating the second method to delete traffic flow specified in this invention.

This invention also provides another method for traffic flow deletion, as shown in FIG. 45. This method includes:

Step 451: generate dynamic traffic flow deletion response carrying FID and direction information;

Step 452: send the said dynamic traffic flow deletion response.

As an alternative embodiment, the above dynamic service deletion request and dynamic service deletion response may adopt the frame with the structure shown in FIG. 30.

For the methods for traffic flow deletion shown in FIG. 44 and FIG. 45, this invention also provides two types of devices for traffic flow deletion, including generation unit and sending unit, wherein generation unit is used for generating the information to be generated in the generation step in relevant method, while the sending unit is used for sending the information generated in generation unit.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Additionally, any term "or" used in the claims or the specification intends to represent a "nonexclusive or".

The invention claimed is:

1. A traffic flow establishing method comprising:
   Send/Receive dynamic service establishing request with destination identifier and traffic flow identifier (FID); and
   Receive/Send response to dynamic service establishing request,
   wherein the dynamic service establishing request carries FID maximum buffer capability, and indicates a number of Mac Protocol Data Units ("MPDUs") of the dynamic service establishing request with maximum cache at the receiving end.

2. The method of claim 1, wherein, the response to dynamic service establishing request comprises either one of:
   acknowledgement indicating that the dynamic service establishing request is correctly received; and
   sending dynamic service establishing request carry service parameters; or dynamic service establishing response carrying the FID.

3. The method of claim 2, wherein the response to dynamic service establishing request further comprises sending acknowledgement indicating that the dynamic service establishing response is correctly received.

4. The method of claim 2, wherein the dynamic service establishing request carries service parameters; and
the dynamic service establishing response further carries adjusted service parameters; wherein
the traffic flow establishing method further comprises:
confirming reserved resource according to the service parameters in dynamic service establishing request;
adjusting service parameters in the dynamic service establishing request according to the reserved resource; and
carrying the adjusted service parameters in the dynamic service establishing response.

5. The method of claim 1, further comprising:
after sending the dynamic service establishing request within the preset number of frames, If the response is not received, re-sending the dynamic service establishing request, or ending this process; and
after sending the dynamic service establishing response within the preset number of frames, If the acknowledgement is not received, re-sending the dynamic service establishing response, or end this process.

6. A traffic flow changing method, comprising:
sending dynamic service change request with destination identifier, traffic flow identifier (FID) and new service parameters; receiving response to dynamic service change request,
wherein the dynamic service change request carries FID maximum buffer capability, and indicates a number of Mac Protocol Data Units ("MPDUs") of the dynamic service change request with maximum cache at the receiving end.

7. The method of claim 6, wherein, the response to dynamic service change request comprises either one of:
acknowledgement indicating that the dynamic service change request is correctly received; or
dynamic service change response carrying the FID.

8. The method of claim 7, wherein, further includes: send acknowledgement indicating that the dynamic service change response is correctly received.

9. The method of claim 6, further comprising:
after sending the dynamic service change request within the preset number of frames, if the response is not received, re-sending the dynamic service change request, or ending this process; and
after sending the dynamic service change response within the preset number of frames, if the acknowledgement is not received, re-sending the dynamic service change response.

10. The method of claim 7, further comprising:
confirming the reserved resource of the traffic flow to be modified according to the new service parameters;
adjusting the new service parameters according to the reserved resource; and
changing current service parameters corresponding to the FID and destination identifier according to adjusted new service parameters, and carrying the modified service parameters in the dynamic service change response.

11. A traffic flow establishing device comprising:
request sending unit, which sends dynamic service establishing request carrying destination identifier and traffic flow identifier ("FID");
response receiving unit, which receives the response to the dynamic service establishing request;
direction information provision unit and/or buffer capacity provision unit; wherein the direction information provision unit is used to send the information that indicates the direction of uplink or downlink traffic flows to be created to the request sending unit, which will be sent with dynamic service establishing request; and
the buffer capacity provision unit is used to provide FID maximum buffer capability to the request sending unit, which will be further sent with dynamic service establishing request, and the FID maximum buffer capability indicates a number of Mac Protocol Data Units ("MPDUs") of the dynamic service establishing request with maximum cache at the receiving end.

12. A traffic flow change device comprising:
request sending unit, which sends dynamic service change request carrying destination identifier, traffic flow identifier FID and new service parameters;
response receiving unit, which receives the response to the dynamic service change request;
direction information provision unit and/or buffer capacity provision unit; wherein the direction information provision unit is used to send the information that indicates the direction of uplink or downlink traffic flows to be changed to the request sending unit, which will be sent with dynamic service change request; and
the buffer capacity provision unit is used to provide FID maximum buffer capability to the request sending unit, which will be further sent with dynamic service change request, and the FID maximum buffer capability indicates a number of Mac Protocol Data Units ("MPDUs") of the dynamic service change request with maximum cache at the receiving end.

\* \* \* \* \*